United States Patent
Ruthfield et al.

(10) Patent No.: US 7,360,171 B2
(45) Date of Patent: Apr. 15, 2008

(54) METHODS AND SYSTEMS OF PROVIDING INFORMATION TO COMPUTER USERS

(75) Inventors: Scott L. Ruthfield, Seattle, WA (US); Richard Banks, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 521 days.

(21) Appl. No.: 11/103,836

(22) Filed: Apr. 12, 2005

(65) Prior Publication Data

US 2005/0177803 A1 Aug. 11, 2005

Related U.S. Application Data

(60) Continuation of application No. 11/056,439, filed on Feb. 11, 2005, which is a division of application No. 09/599,806, filed on Jun. 21, 2000, now Pat. No. 6,948,135.

(51) Int. Cl.
G06F 17/21 (2006.01)
G06K 3/00 (2006.01)

(52) U.S. Cl. .................................... 715/804; 715/749

(58) Field of Classification Search ................ 715/804, 715/805, 802, 749, 748, 760, 762, 763, 738, 715/781, 866, 501.1, 513, 517; 705/213; 704/223, 217

See application file for complete search history.

(56) References Cited

U.S. PATENT DOCUMENTS

| | | |
|---|---|---|
| 4,498,147 A | 2/1985 | Agnew et al. |
| 4,514,800 A | 4/1985 | Gruner et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |

(Continued)

FOREIGN PATENT DOCUMENTS

EP 0841615 11/1999

(Continued)

OTHER PUBLICATIONS

Pike et al., "Plan 9 from Bell Labs" UKUUG Summer 1990 10 pages.

(Continued)

*Primary Examiner*—Steven Sax

(57) ABSTRACT

Systems of providing information to computer users are described. In one embodiment, the system comprises means for displaying, in a navigable window of a display area of a user interface, a first contextual display associated with a first context that can enable a user to accomplish one or more tasks. The system further comprises means for, without changing the first context, presenting quick links to one or more contexts that are different from the user's current context and that are provided by the single application program, each context being associated with a functionality that can enable the user to accomplish various tasks that are different from the one or more tasks that the user can accomplish using the first contextual display, the quick links being selectable to navigate the navigable window to a context associated with a selectable quick link.

20 Claims, 11 Drawing Sheets

U.S. PATENT DOCUMENTS

| | | |
|---|---|---|
| 4,933,880 A | 6/1990 | Borgendal et al. |
| 4,962,475 A | 10/1990 | Hernandez et al. |
| 5,072,412 A | 12/1991 | Henderson, Jr. et al. |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffernan et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,864,819 A | 1/1999 | De Armas et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,974,454 A | 10/1999 | Apfel et al. |
| 5,982,370 A | 11/1999 | Kamper |
| 5,987,480 A | 11/1999 | Donohue et al. |
| 5,991,710 A | 11/1999 | Papineni et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin, Jr. et al. |
| 6,052,710 A | 4/2000 | Saliba et al. |
| 6,054,987 A | 4/2000 | Richardson |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,708 A | 7/2000 | Burch et al. |
| 6,091,417 A | 7/2000 | Lefkowitz |
| 6,094,657 A | 7/2000 | Hailpern et al. |
| 6,097,382 A | 8/2000 | Rosen et al. |
| 6,098,081 A | 8/2000 | Heidorn et al. |

| | | | |
|---|---|---|---|
| 6,108,637 A | 8/2000 | Blumenau | |
| 6,108,783 A | 8/2000 | Krawczyk et al. | |
| 6,115,646 A | 9/2000 | Fiszman et al. | |
| 6,121,965 A | 9/2000 | Kenney et al. | |
| 6,122,647 A | 9/2000 | Horowitz et al. | |
| 6,144,969 A | 11/2000 | Inokuchi et al. | |
| 6,151,624 A | 11/2000 | Teare et al. | |
| 6,154,128 A | 11/2000 | Wookey et al. | |
| 6,163,772 A | 12/2000 | Kramer et al. | |
| 6,167,521 A | 12/2000 | Smith et al. | |
| 6,167,523 A | 12/2000 | Strong | |
| 6,182,095 B1 | 1/2001 | Leymaster et al. | |
| 6,188,401 B1 | 2/2001 | Peyer | |
| 6,191,797 B1 | 2/2001 | Politis | |
| 6,192,367 B1 | 2/2001 | Hawley et al. | |
| 6,195,661 B1 | 2/2001 | Filepp et al. | |
| 6,199,204 B1 | 3/2001 | Donohue | |
| 6,209,128 B1 | 3/2001 | Gerard et al. | |
| 6,216,152 B1 | 4/2001 | Wong et al. | |
| 6,219,698 B1 | 4/2001 | Iannucci et al. | |
| 6,225,996 B1 | 5/2001 | Gibb et al. | |
| 6,235,027 B1 | 5/2001 | Herzon | |
| 6,253,366 B1 | 6/2001 | Mutschler, III | |
| 6,253,374 B1 | 6/2001 | Dresevic et al. | |
| 6,263,313 B1 | 7/2001 | Milsted et al. | |
| 6,266,810 B1 | 7/2001 | Tanaka et al. | |
| 6,268,852 B1 | 7/2001 | Lindhorst et al. | |
| 6,272,506 B1 | 8/2001 | Bell | |
| 6,275,227 B1 | 8/2001 | DeStefano | |
| 6,275,599 B1 | 8/2001 | Adler et al. | |
| 6,281,896 B1 | 8/2001 | Alimpich et al. | |
| 6,282,711 B1 | 8/2001 | Halpern et al. | |
| 6,286,033 B1 | 9/2001 | Kishinsky et al. | |
| 6,292,897 B1 | 9/2001 | Gennaro et al. | |
| 6,297,819 B1 | 10/2001 | Furst | |
| 6,300,948 B1 | 10/2001 | Geller et al. | |
| 6,307,955 B1 | 10/2001 | Zank et al. | |
| 6,308,179 B1 | 10/2001 | Petersen et al. | |
| 6,311,271 B1 | 10/2001 | Gennaro et al. | |
| 6,321,259 B1 | 11/2001 | Ouellette et al. | |
| 6,321,334 B1 | 11/2001 | Jerger et al. | |
| 6,327,628 B1 | 12/2001 | Anuff et al. | |
| 6,331,864 B1 | 12/2001 | Coco et al. | |
| 6,342,907 B1 | 1/2002 | Petty et al. | |
| 6,343,302 B1 | 1/2002 | Graham | |
| 6,345,256 B1 | 2/2002 | Milsted et al. | |
| 6,345,278 B1 | 2/2002 | Hitchcock et al. | |
| 6,345,361 B1 | 2/2002 | Jerger et al. | |
| 6,347,323 B1 | 2/2002 | Garber et al. | |
| 6,349,408 B1 | 2/2002 | Smith | |
| 6,353,926 B1 | 3/2002 | Parthesarathy et al. | |
| 6,356,906 B1 | 3/2002 | Lippert et al. | |
| 6,357,038 B1 | 3/2002 | Scouten | |
| 6,366,907 B1 | 4/2002 | Fanning et al. | |
| 6,366,912 B1 | 4/2002 | Wallent et al. | |
| 6,367,013 B1 | 4/2002 | Bisbee et al. | |
| 6,369,840 B1 | 4/2002 | Barnett et al. | |
| 6,369,841 B1 | 4/2002 | Salomon et al. | |
| 6,374,402 B1 | 4/2002 | Schmeidler et al. | |
| 6,381,742 B2 | 4/2002 | Forbes et al. | |
| 6,381,743 B1 | 4/2002 | Mutschler, III | |
| 6,389,434 B1 | 5/2002 | Rivette et al. | |
| 6,393,456 B1 | 5/2002 | Ambler et al. | |
| 6,396,488 B1 | 5/2002 | Simmons et al. | |
| 6,405,221 B1 * | 6/2002 | Levine et al. | 715/501.1 |
| 6,408,311 B1 | 6/2002 | Baisley et al. | |
| 6,414,700 B1 | 7/2002 | Kurtenbach et al. | |
| 6,421,070 B1 | 7/2002 | Ramos et al. | |
| 6,421,656 B1 | 7/2002 | Cheng et al. | |
| 6,425,125 B1 | 7/2002 | Fries et al. | |
| 6,429,885 B1 | 8/2002 | Saib et al. | |
| 6,434,563 B1 | 8/2002 | Pasquali et al. | |
| 6,434,564 B2 | 8/2002 | Ebert | |
| 6,442,563 B1 | 8/2002 | Bacon et al. | |
| 6,442,755 B1 | 8/2002 | Lemmons et al. | |
| 6,446,110 B1 | 9/2002 | Lection et al. | |
| 6,449,617 B1 | 9/2002 | Quinn et al. | |
| 6,457,009 B1 | 9/2002 | Bollay | |
| 6,460,058 B2 | 10/2002 | Koppolu et al. | |
| 6,463,419 B1 | 10/2002 | Kluss | |
| 6,470,349 B1 | 10/2002 | Heninger et al. | |
| 6,473,800 B1 | 10/2002 | Jerger et al. | |
| 6,476,828 B1 | 11/2002 | Burkett et al. | |
| 6,476,833 B1 | 11/2002 | Moshfeghi | |
| 6,477,544 B1 | 11/2002 | Bolosky et al. | |
| 6,480,860 B1 | 11/2002 | Monday | |
| 6,487,566 B1 | 11/2002 | Sundaresan | |
| 6,490,601 B1 | 12/2002 | Markus et al. | |
| 6,493,702 B1 | 12/2002 | Adar et al. | |
| 6,502,101 B1 | 12/2002 | Verprauskus et al. | |
| 6,502,103 B1 | 12/2002 | Frey et al. | |
| 6,505,230 B1 | 1/2003 | Mohan et al. | |
| 6,505,300 B2 | 1/2003 | Chan et al. | |
| 6,507,856 B1 | 1/2003 | Chen et al. | |
| 6,516,322 B1 | 2/2003 | Meredith | |
| 6,519,617 B1 | 2/2003 | Wanderski et al. | |
| RE38,070 E | 4/2003 | Spies et al. | |
| 6,546,546 B1 | 4/2003 | Van Doorn et al. | |
| 6,549,221 B1 | 4/2003 | Brown et al. | |
| 6,549,878 B1 | 4/2003 | Lowry et al. | |
| 6,549,922 B1 | 4/2003 | Srivastava et al. | |
| 6,553,402 B1 | 4/2003 | Makarios et al. | |
| 6,560,616 B1 * | 5/2003 | Garber | 707/203 |
| 6,560,620 B1 | 5/2003 | Ching | |
| 6,560,640 B2 | 5/2003 | Smethers | |
| 6,563,514 B1 | 5/2003 | Samar | |
| 6,571,253 B1 | 5/2003 | Thompson et al. | |
| 6,578,144 B1 | 6/2003 | Gennaro et al. | |
| 6,581,061 B2 | 6/2003 | Graham | |
| 6,584,548 B1 | 6/2003 | Bourne et al. | |
| 6,585,778 B1 | 7/2003 | Hind et al. | |
| 6,589,290 B1 | 7/2003 | Maxwell et al. | |
| 6,598,219 B1 | 7/2003 | Lau | |
| 6,603,489 B1 | 8/2003 | Edlund et al. | |
| 6,604,099 B1 | 8/2003 | Chung et al. | |
| 6,606,606 B2 | 8/2003 | Starr | |
| 6,609,200 B2 | 8/2003 | Anderson et al. | |
| 6,611,822 B1 | 8/2003 | Beams et al. | |
| 6,611,840 B1 | 8/2003 | Baer et al. | |
| 6,613,098 B1 | 9/2003 | Sorge et al. | |
| 6,615,276 B1 | 9/2003 | Mastrianni et al. | |
| 6,629,109 B1 | 9/2003 | Koshisaka | |
| 6,631,357 B1 | 10/2003 | Perkowski | |
| 6,631,379 B2 | 10/2003 | Cox | |
| 6,631,497 B1 | 10/2003 | Jamshidi et al. | |
| 6,631,519 B1 | 10/2003 | Nicholson et al. | |
| 6,632,251 B1 | 10/2003 | Rutten et al. | |
| 6,635,089 B1 | 10/2003 | Burkett et al. | |
| 6,636,845 B2 | 10/2003 | Chau et al. | |
| 6,643,633 B2 | 11/2003 | Chau et al. | |
| 6,643,652 B2 | 11/2003 | Helgeson et al. | |
| 6,643,684 B1 | 11/2003 | Malkin et al. | |
| 6,651,217 B1 | 11/2003 | Kennedy et al. | |
| 6,654,737 B1 | 11/2003 | Nunez | |
| 6,654,932 B1 | 11/2003 | Bahrs et al. | |
| 6,658,417 B1 | 12/2003 | Stakutis et al. | |
| 6,658,622 B1 | 12/2003 | Aiken et al. | |
| 6,668,369 B1 | 12/2003 | Krebs et al. | |
| 6,671,805 B1 | 12/2003 | Brown et al. | |
| 6,675,202 B1 | 1/2004 | Perttunen | |
| 6,678,717 B1 | 1/2004 | Schneider | |
| 6,691,230 B1 | 2/2004 | Bardon | |
| 6,691,281 B1 | 2/2004 | Sorge et al. | |
| 6,697,944 B1 | 2/2004 | Jones et al. | |
| 6,701,434 B1 | 3/2004 | Rohatgi | |
| 6,701,486 B1 | 3/2004 | Weber et al. | |

| | | | | | |
|---|---|---|---|---|---|
| 6,704,906 B1 | 3/2004 | Yankovich et al. | 2002/0010746 A1 | 1/2002 | Jilk et al. |
| 6,711,679 B1 | 3/2004 | Guski et al. | 2002/0013788 A1 | 1/2002 | Pennell et al. |
| 6,720,985 B1 | 4/2004 | Silverbrook et al. | 2002/0026441 A1 | 2/2002 | Kutay et al. |
| 6,725,426 B1 | 4/2004 | Pavlov | 2002/0026461 A1 | 2/2002 | Kutay et al. |
| 6,735,721 B1 | 5/2004 | Morrow et al. | 2002/0032590 A1 | 3/2002 | Anand et al. |
| 6,748,385 B1 | 6/2004 | Rodkin et al. | 2002/0032692 A1 | 3/2002 | Suzuki et al. |
| 6,751,777 B2 | 6/2004 | Bates et al. | 2002/0032706 A1 | 3/2002 | Perla et al. |
| 6,754,874 B1 | 6/2004 | Richman | 2002/0032768 A1 | 3/2002 | Voskuil |
| 6,757,868 B1 | 6/2004 | Glaser et al. | 2002/0035579 A1 | 3/2002 | Wang et al. |
| 6,760,723 B2 | 7/2004 | Oshinsky et al. | 2002/0035581 A1 | 3/2002 | Reynar et al. |
| 6,763,343 B1 | 7/2004 | Brooke et al. | 2002/0040469 A1 | 4/2002 | Pramberger |
| 6,772,139 B1 | 8/2004 | Smith, III | 2002/0054128 A1 | 5/2002 | Lau et al. |
| 6,772,165 B2 | 8/2004 | O'Carroll | 2002/0057297 A1 | 5/2002 | Grimes et al. |
| 6,774,926 B1 | 8/2004 | Ellis et al. | 2002/0065798 A1 | 5/2002 | Bostleman et al. |
| 6,779,154 B1 | 8/2004 | Nussbaum et al. | 2002/0070973 A1 | 6/2002 | Croley |
| 6,781,609 B1 | 8/2004 | Barker et al. | 2002/0078074 A1 | 6/2002 | Cho et al. |
| 6,799,299 B1 | 9/2004 | Li et al. | 2002/0078103 A1 | 6/2002 | Gorman et al. |
| 6,801,929 B1 | 10/2004 | Donoho et al. | 2002/0100027 A1 | 7/2002 | Binding |
| 6,816,849 B1 | 11/2004 | Halt, Jr. | 2002/0112224 A1 | 8/2002 | Cox |
| 6,845,380 B2 | 1/2005 | Su et al. | 2002/0129056 A1 | 9/2002 | Conant |
| 6,845,499 B2 | 1/2005 | Srivastava et al. | 2002/0133484 A1 | 9/2002 | Chau |
| 6,847,387 B2 | 1/2005 | Roth | 2002/0152244 A1 | 10/2002 | Dean et al. |
| 6,848,078 B1 | 1/2005 | Birsan et al. | 2002/0156772 A1 | 10/2002 | Chau |
| 6,871,220 B1 | 3/2005 | Rajan et al. | 2002/0156846 A1 | 10/2002 | Rawat et al. |
| 6,874,130 B1 | 3/2005 | Baweja et al. | 2002/0156929 A1 | 10/2002 | Hekmatpour |
| 6,876,996 B2 | 4/2005 | Czajkowski et al. | 2002/0169752 A1 | 11/2002 | Kusama et al. |
| 6,889,359 B1 | 5/2005 | Conner et al. | 2002/0169789 A1 | 11/2002 | Kutay et al. |
| 6,901,403 B1 | 5/2005 | Bata et al. | 2002/0174147 A1 | 11/2002 | Wang et al. |
| 6,915,454 B1 | 7/2005 | Moore et al. | 2002/0174417 A1 | 11/2002 | Sijacic et al. |
| 6,931,532 B1 | 8/2005 | Davis et al. | 2002/0184219 A1 | 12/2002 | Preisig |
| 6,941,510 B1 | 9/2005 | Ozzie et al. | 2002/0188597 A1 | 12/2002 | Kern et al. |
| 6,941,511 B1 | 9/2005 | Hind et al. | 2002/0188613 A1 | 12/2002 | Chakraborty et al. |
| 6,941,521 B2 | 9/2005 | Lin et al. | 2002/0194219 A1 | 12/2002 | Bradley et al. |
| 6,948,133 B2 | 9/2005 | Haley | 2002/0196281 A1 | 12/2002 | Audleman et al. |
| 6,948,135 B1 * | 9/2005 | Ruthfield et al. ............ 715/854 | 2002/0196288 A1 | 12/2002 | Emrani |
| 6,950,980 B1 | 9/2005 | Malcolm | 2002/0198891 A1 | 12/2002 | Li |
| 6,961,897 B1 | 11/2005 | Peel, Jr. et al. | 2002/0198935 A1 | 12/2002 | Crandall et al. |
| 6,963,875 B2 | 11/2005 | Moore et al. | 2003/0004951 A1 | 1/2003 | Chokshi |
| 6,968,503 B1 | 11/2005 | Chang et al. | 2003/0007000 A1 | 1/2003 | Carison et al. |
| 6,968,505 B2 | 11/2005 | Stoll et al. | 2003/0014397 A1 | 1/2003 | Chau |
| 6,993,714 B2 | 1/2006 | Kaler et al. | 2003/0018668 A1 | 1/2003 | Britton et al. |
| 6,996,776 B1 | 2/2006 | Makely et al. | 2003/0020746 A1 | 1/2003 | Chen et al. |
| 6,996,781 B1 | 2/2006 | Myers et al. | 2003/0023641 A1 | 1/2003 | Gorman et al. |
| 7,003,722 B2 | 2/2006 | Rothchiller et al. | 2003/0025732 A1 | 2/2003 | Prichard |
| 7,010,580 B1 * | 3/2006 | Fu et al. .................... 709/217 | 2003/0033037 A1 | 2/2003 | Yuen et al. |
| 7,024,417 B1 | 4/2006 | Russakovsky et al. | 2003/0037303 A1 | 2/2003 | Bodlaender et al. |
| 7,032,170 B2 | 4/2006 | Poulose | 2003/0043986 A1 | 3/2003 | Creamer |
| 7,036,072 B1 | 4/2006 | Sulistio et al. | 2003/0046665 A1 | 3/2003 | Llin |
| 7,039,875 B2 | 5/2006 | Khalfay et al. | 2003/0048301 A1 | 3/2003 | Menninger |
| 7,051,273 B1 | 5/2006 | Holt et al. | 2003/0051243 A1 | 3/2003 | Lemmons et al. |
| 7,058,663 B2 | 6/2006 | Johnston et al. | 2003/0055811 A1 | 3/2003 | Stork et al. |
| 7,062,764 B2 | 6/2006 | Cohen et al. | 2003/0055828 A1 | 3/2003 | Koch et al. |
| 7,065,493 B1 | 6/2006 | Homsi | 2003/0056198 A1 | 3/2003 | Al-Azzawe |
| 7,080,325 B2 | 7/2006 | Treibach-Heck et al. | 2003/0061386 A1 | 3/2003 | Brown |
| 7,086,009 B2 | 8/2006 | Resnick et al. | 2003/0061567 A1 | 3/2003 | Brown et al. |
| 7,088,374 B2 | 8/2006 | David et al. | 2003/0074279 A1 | 4/2003 | Viswanath et al. |
| 7,103,611 B2 | 9/2006 | Murthy et al. | 2003/0084424 A1 | 5/2003 | Reddy et al. |
| 7,106,888 B1 | 9/2006 | Silverbrook et al. | 2003/0093755 A1 | 5/2003 | O'Carroll |
| 7,107,282 B1 | 9/2006 | Yalmanchi | 2003/0120578 A1 | 6/2003 | Newman |
| 7,107,521 B2 | 9/2006 | Santos | 2003/0120651 A1 | 6/2003 | Bernstein et al. |
| 7,152,205 B2 | 12/2006 | Day et al. | 2003/0120659 A1 | 6/2003 | Anandampilla |
| 7,190,376 B1 | 3/2007 | Tonisson | 2003/0120671 A1 | 6/2003 | Kim et al. |
| 7,191,394 B1 | 3/2007 | Ardeleanu et al. | 2003/0120686 A1 | 6/2003 | Kim et al. |
| 7,281,018 B1 | 10/2007 | Begun et al. | 2003/0126555 A1 | 7/2003 | Aggarwal et al. |
| 2001/0007109 A1 | 7/2001 | Lange | 2003/0128196 A1 | 7/2003 | Lapstun et al. |
| 2001/0022592 A1 | 9/2001 | Alimpich et al. | 2003/0135825 A1 | 7/2003 | Gertner et al. |
| 2001/0024195 A1 | 9/2001 | Hayakawa | 2003/0140132 A1 | 7/2003 | Champagne et al. |
| 2001/0037345 A1 | 11/2001 | Kiernan | 2003/0158897 A1 | 8/2003 | Ben-Natan et al. |
| 2001/0054004 A1 | 12/2001 | Powers | 2003/0167277 A1 | 9/2003 | Hejlaberg et al. |
| 2001/0056429 A1 | 12/2001 | Moore et al. | 2003/0182268 A1 | 9/2003 | Lal |
| 2001/0056460 A1 | 12/2001 | Sahota et al. | 2003/0182327 A1 | 9/2003 | Ramanujam et al. |
| 2002/0010700 A1 | 1/2002 | Wotring | 2003/0187756 A1 | 10/2003 | Klivington et al. |
| 2002/0010743 A1 | 1/2002 | Ryan et al. | 2003/0187930 A1 | 10/2003 | Ghaffar |

| | | |
|---|---|---|
| 2003/0188260 A1 | 10/2003 | Jensen et al. |
| 2003/0189593 A1 | 10/2003 | Yarvin |
| 2003/0192008 A1 | 10/2003 | Lee |
| 2003/0204511 A1 | 10/2003 | Brundage |
| 2003/0204814 A1 | 10/2003 | Elo |
| 2003/0205615 A1 | 11/2003 | Marappan |
| 2003/0212664 A1 | 11/2003 | Breining et al. |
| 2003/0217053 A1 | 11/2003 | Bachman et al. |
| 2003/0220930 A1 | 11/2003 | Milleker et al. |
| 2003/0225469 A1 | 12/2003 | DeRemer et al. |
| 2003/0225768 A1 | 12/2003 | Chaudhuri |
| 2003/0225829 A1 | 12/2003 | Pena |
| 2003/0226111 A1 | 12/2003 | Wirts et al. |
| 2003/0226132 A1 | 12/2003 | Tondreau et al. |
| 2003/0233374 A1 | 12/2003 | Spinola et al. |
| 2003/0236859 A1 | 12/2003 | Vaschillo et al. |
| 2003/0237046 A1 | 12/2003 | Parker et al. |
| 2003/0237047 A1 | 12/2003 | Borson |
| 2004/0002939 A1 | 1/2004 | Arora |
| 2004/0003031 A1 | 1/2004 | Brown et al. |
| 2004/0003353 A1 | 1/2004 | Rivera et al. |
| 2004/0003389 A1 | 1/2004 | Reynar et al. |
| 2004/0010752 A1 | 1/2004 | Chan et al. |
| 2004/0024842 A1 | 2/2004 | Witt |
| 2004/0030991 A1 | 2/2004 | Hepworth et al. |
| 2004/0039990 A1 | 2/2004 | Bakar et al. |
| 2004/0039993 A1 | 2/2004 | Kougiouris et al. |
| 2004/0044961 A1 | 3/2004 | Pesenson |
| 2004/0044965 A1 | 3/2004 | Toyama et al. |
| 2004/0054966 A1 | 3/2004 | Busch et al. |
| 2004/0059754 A1 | 3/2004 | Barghout et al. |
| 2004/0073565 A1 | 4/2004 | Kaufman et al. |
| 2004/0073868 A1 | 4/2004 | Easter et al. |
| 2004/0078756 A1 | 4/2004 | Napper et al. |
| 2004/0083426 A1 | 4/2004 | Sahu |
| 2004/0088647 A1 | 5/2004 | Miller et al. |
| 2004/0093596 A1 | 5/2004 | Koyano |
| 2004/0107367 A1 | 6/2004 | Kisters |
| 2004/0117769 A1 | 6/2004 | Lauzon |
| 2004/0123277 A1 | 6/2004 | Schrader et al. |
| 2004/0146199 A1 | 7/2004 | Berkner et al. |
| 2004/0163041 A1 | 8/2004 | Engel |
| 2004/0172442 A1 | 9/2004 | Ripley |
| 2004/0186762 A1 | 9/2004 | Beaven et al. |
| 2004/0189716 A1 | 9/2004 | Paoli et al. |
| 2004/0194035 A1 | 9/2004 | Chakraborty |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler et al. |
| 2004/0205592 A1 | 10/2004 | Huang |
| 2004/0205605 A1 | 10/2004 | Adler et al. |
| 2004/0205653 A1 | 10/2004 | Hadfield et al. |
| 2004/0205671 A1 | 10/2004 | Sukehiro et al. |
| 2004/0221238 A1 | 11/2004 | Cifra et al. |
| 2004/0221245 A1 | 11/2004 | Chickles et al. |
| 2004/0237030 A1 | 11/2004 | Malkin |
| 2004/0268229 A1 | 12/2004 | Paoli et al. |
| 2005/0004893 A1 | 1/2005 | Sangroniz |
| 2005/0005248 A1 | 1/2005 | Rockey et al. |
| 2005/0015732 A1 | 1/2005 | Vedula et al. |
| 2005/0027757 A1 | 2/2005 | Kiessig et al. |
| 2005/0038711 A1 | 2/2005 | Marlelo |
| 2005/0055627 A1 | 3/2005 | Lloyd et al. |
| 2005/0060324 A1 | 3/2005 | Johnson et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076049 A1 | 4/2005 | Qubti et al. |
| 2005/0091285 A1 | 4/2005 | Krishnan et al. |
| 2005/0091305 A1 | 4/2005 | Lange et al. |
| 2005/0102370 A1 | 5/2005 | Lin et al. |
| 2005/0102612 A1 | 5/2005 | Allan et al. |
| 2005/0108104 A1 | 5/2005 | Woo |
| 2005/0108624 A1 | 5/2005 | Carrier |
| 2005/0114757 A1 | 5/2005 | Sahota et al. |
| 2005/0138086 A1 | 6/2005 | Pecht-Seibert |
| 2005/0171746 A1 | 8/2005 | Thalhammer-Reyero |
| 2005/0198086 A1 | 9/2005 | Moore et al. |
| 2005/0198247 A1 | 9/2005 | Perry et al. |
| 2005/0223063 A1 | 10/2005 | Chang et al. |
| 2005/0223320 A1 | 10/2005 | Brinfzenhofe et al. |
| 2005/0240876 A1 | 10/2005 | Myers et al. |
| 2005/0268222 A1 | 12/2005 | Cheng |
| 2006/0020586 A1 | 1/2006 | Prompt et al. |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059434 A1 | 3/2006 | Boss et al. |
| 2006/0069605 A1 | 3/2006 | Hatoun |
| 2006/0085409 A1 | 4/2006 | Rys et al. |
| 2006/0143220 A1 | 6/2006 | Spencer, Jr. |
| 2007/0036433 A1 | 2/2007 | Teutsch |
| 2007/0050719 A1 | 3/2007 | Lui et al. |
| 2007/0061467 A1 | 3/2007 | Essey |
| 2007/0061706 A1 | 3/2007 | Cupala |
| 2007/0074106 A1 | 3/2007 | Ardeleanu |
| 2007/0094589 A1 | 4/2007 | Paoli |
| 2007/0100877 A1 | 5/2007 | Paoli |
| 2007/0101280 A1 | 5/2007 | Paoli |
| 2007/0118803 A1* | 5/2007 | Walker et al. ............... 715/744 |

FOREIGN PATENT DOCUMENTS

| | | |
|---|---|---|
| EP | 0961197 | 12/1999 |
| EP | 1076290 | 2/2001 |
| EP | 1221661 | 7/2002 |
| JP | 3191429 | 1/1900 |
| JP | 63085960 | 4/1988 |
| JP | 401173140 A | 7/1989 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 | 6/2001 |
| WO | WO0157720 | 9/2006 |

OTHER PUBLICATIONS

Zdonik, S., "Object Management System Concepts" ACM 1984 pp. 13-19.

Pike et al., "The Use of Name Spaces in Plan 9" Operating Systems Review vol. 27 No. 2 Apr. 1993 pp. 72-76.

Trupin, J., "The Visual Programmer" Microsoft Systems Journal Apr. 1996 pp. 103-105.

Barker et al., "Creating In-Line Objects Within An Integrated Editing Environment" IBM Technical Disclosure Bulletin vol. 27 No. 5 Oct. 1984 p. 2962.

DiLascia et al., "Sweeper" Microsoft Interactive Developer vol. 1 No. 1 1996 27 pages.

Clapp D., "The NeXT Application Kit Part I: Non-Responsive Classes" The NeXT Bible 1990 Chapter 16 pp. 275-293.

"Store and Organize Related Project Files in a Binder" Getting Results with Microsoft Office 1990 pp. 109-112.

Peterson B., "Unix Variants" Unix Review vol. 10 No. 4 Apr. 1992 pp. 29-31.

Kobayashi et al., "An Update on BTRON-specification OS Developement" IEEE 1991 pp. 132-140.

Staneck W., "Internal and External Media" Electronic Publishing Unleashed 1995 Chapter 22 pp. 510-542.

Herzner et al., "CDAM—Compound Document Access and Management. An Object-Oriented Approach" Multimedia Systems Interaction and Applications 1992 Chapter 3 pp. 17-36.

Berg A., "Naming and Binding: Monikers" Inside Ole 1995 Chapter 9 pp. 431-490.

OMG XML Metadata Interchange (XMI) Specification Version 1.2 Jan. 2002.

Laura Acklen & Read Gilgen, "Using Corel Wordperfect 9", 251-284, 424-434, 583-586 (1998).

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

Leblond et al, "PC Magazine Guide to Qualtro Pro for Windows", pp. 9-11, 42-61, Ziff-Davis Press, Copyright 1993 by the LeBlond Group.

Mansfield, "Excel 97 for Busy People", Published by Osborne/Mcgraw-Hill 1997 pp. 48-50.

"Microsoft Visual Basic 5.0 Programmer's Guide 1997"; pp. 578-579; Redmond WA 98052-6399.

Altova, Inc., "XML Spy 4.0 Manual," Altova Inc. & Altova GmbH, copyright 1998-2001, Chapters 1, 2, and 6, encompassing pp. 1-17, 18-90, and 343-362.

Cybook, Inc.: "Copying the Search Form to Services-based Web Sites" INternet Article, (online) Jul. 26, 2004. "the whole document".

Excel Developer Tip (hereinafter "Excel"), "Determining the Data Type of a Cell", May 13, 1998, p. 1 (avaliable at http://jwalk.com/ss//excel/tips/tip62.htm).

Macromedia, Inc.: "Dreamweaver Technote, Changes in copying and pasting in Dreamweaver 4" Internet Article (online). "the whole document".

Rado, Dave: "How to create a template that makes it easy for users to "fill in the blanks", without doing any programming" Microsoft Word MVP FAQ Site, (online) Apr. 30, 2004, the whole document.

Borland, Russo "Running Microsoft Word 97", 314-315, 338, 361-362, 390, and 714-719.

"Microsoft Word 2000", Screenshots, (1999), 1-5.

Beauchemin, Dave "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).

Dubinko, Micah "XForms and Microsoft InfoPath", Retrieved from the Internet at http://www.xml.com/lpt/a/1311 on Jan. 21, 2007,(Oct. 29, 2003).

Udell, Jon "InfoPath and XForms", Retrieved from the Internet at http://weblog.infoworld.com/udell/2003/02/26.html,(Feb. 26, 2003).

Hoffman, Michael "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Singh, Darshan "Microsoft InfoPath 2003 By Example", Retrieved from the Internet at http://www.perfectxml.com/InfoPath.asp on Jan. 21, 2007,(Apr. 20, 2003).

Raman, T. V., et al., "XForms 1.0", (Dec. 2001),Section 1-12.2.3 & Appendices A-G.

"Enter Key", Retrieved from the Internet at http://systems.webopedia.com/TERM/Enter_key.html on Dec. 20, 2006.

Lehtonen, Miro et al., "A Dynamic User Interface for Document Assembly", Department of Computer Science, University of Helsinki,(Nov. 2002).

Rees, Michael J., "Evolving the Browser Towards a Standard User Interface Architecture", School of Information Technology, Bond University, Australia,(2001).

"Microsoft Visual Basic 5.0 Programmer's Guide", *Microsoft Press*, (1997),pp. 42-43, 54-58.

Nelson, Joe "Client-side Form Validation Using JavaScript", *Developer Advisory*, (Sep. 21, 2001).

Brabrand, et al., "Power Forms Declarative Client-side Form Field Validation", (2002),1-20.

Anat, Eyal et al., "Integrating and Customizing Hererogeneous E-Commerce Applications", The VLDB Journal-The International Journal on Very Large Data Bases, vol. 10, Issue 1,(Aug. 2001), 16-38.

Adams, Susie et al., "BizTalk Unleashed", Sams publishing, 2002, first printing Mar. 2001, 1-2, 31-138.

Vasters, Clemens F., "BizTalk Server 2000 A Beginner's Guide", Osborne/McGraw-Hill,(2001),1-2, 359-402.

Halberg, Bruce et al., "Using Microsoft Excel 97", (1997),191-201, 213-219.

Villard, et al., "An Incremental XSLT Transformation Processor for XML Document Manipulation", http://www2002.org/CDROM/refereed/321, Printed on May 18, 2007,25 pages.

Grosso, et al., "XML Fragment Interchange", W3C,(Feb. 2001),1-28.

Altova, et al., "User and Reference Manual Version 4.4", www.xmlspy.com, (May 24, 2007),1-565.

"XForm 1.0", W3C,(Jul. 16, 2001).

"Architecture for a Dynamic Information Area Control" IBM Technical Disclosure Bulletin IBM Corp. New York US vol. 37 No. 10 Jan. 10, 1994. pp. 245-246.

Alschuler Liora "A tour of Xmetal" O'Reilly XML.com 'Online Jul. 14, 1999 XP002230081 retrieved from the Internet: <URL:http://www.xml.com/pub/a/SeyboldReport/ip0311025.html> retrieved on Feb. 5, 2003.

Au Irene et al. "Netscape Communicator's Collapsible Toolbars" CHI'98 Human Factors in Computing Systems Conference Proceedings Los Angeles CA Apr. 18-23, 1998 pp. 81-86.

Battle Steven A. et al.; "Flexible Information Presentation with XML" 1998 The Institution of Electrical Engineers 6 pages.

Brogden William; "Arbortext Adept 8 Editor Review" O'Reilly XML.com 'Online! Sep. 22, 1999 XP002230080 retrieved from the Internet <URL:http://www.xml.com/pub/a/1999/09/adept/AdeptRvw.htm> retrieved on Feb. 5, 2003.

Chen Yi et al.: A; "XKvalidator: A Constraint Validator for XML" CIKM'-2 Nov. 4-9, 2002 Copyright 2002 ACM 1-58113-492-4/02/0011 pp. 446-452.

Ciancarini Paolo et al.; "Managing Complex Documents Over the WWW: A Case Study for XML" IEEE Transactions on Knowledge and Data Engineering vol. 11 No. 4 Jul./Aug. 1999. pp. 629-938.

Davidow Ari; Alle; "XML Editors: Allegations of Functionality in search of reality" Internet 'Online! 1999 XP002230082 retrieved from the Internet <URL:http://www.ivritype.com/xml/>.

Kanemoto Hirotaka et al; "An Efficiently Updatable Index Scheme for Structured Documents" 1998 IEEE pp. 991-996.

Sutanthavibul Supoj et al.; "XFIG Version 3.2 Patchlevel 2 (Jul. 2, 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan. 28, 2003].

Usdin Tommie et al.; "XML: Not a Silver Bullet But a Great Pipe Wrench" Standardview vol. 6. No. 3 Sep. 1998 pp. 125-132.

Chien Shu-Yao et al.; "Efficient Management of Multiversion Documents by Object Referencing" Proceedings of the 27th VLDB Conference 2001 pp. 291-300.

Chien Shu-Yao et al.; "Efficient schemes for managing multiversion XML documents" VLDB Journal (2002) pp. 332-352.

Chien Shu-Yao et al.; "Storing and Querying Multiversion XML Documents using Durable Node Numbers" IEEE 2002 pp. 232-241.

Chien Shu-Yao et al.; "XML Document Versioning" SIGMOD Record vol. 30 No. 3 Sep. 2001 pp. 46-53.

Dyck Timothy; "XML Spy Tops as XML Editor" http://www.eweek.com/article2/0395972404100.asp Nov. 25, 2002 4 pages.

Haukeland Jan-Henrick; "Tsbiff—tildeslash biff—version 1.2.1" Internet Document [Online] Jun. 1999 URL: http://web.archive.org/web/199990912001527/http://www.tildeslash.com/tsbiff/.

Nelson Mark; "Validation with MSXML and XML Scheme" Windows Developer Magazine Jan. 2002 pp. 35-38.

Netscape Communication Corporation; "Netscape Communicator 4.61 for OS/2 Warp" Software 1999 The whole software release & "Netscape—Version 4.6 [en]-010615".

Noore A.; "A secure conditional access system using digital signature and encryption" 2003 Digest of Technical Papers. International Conference on Consumer Electronics Jun. 2003 pp. 220-221.

Rogge et al.; "Validating MPEG-21 Encapsulated Functional Metadata" IEEE 2002 pp. 209-212.

Wong Raymond K. et al.; "Managing and Querying Multi-Version XML Data with Update Logging" DocEng '02 Nov. 8-9, 2002 Copyright 2002 ACM 1-58113-594-7/02/0011 pp. 74-81.

Cheng Ya Bing et al.; "Designing Valid XML Views" ER 2002 LNCS 2503 2002 Springer-Verlag Berlin Heidelberg 2002 pp. 463-477.

Chuang Tyng-Ruey; "Generic Validation of Structural Content with Parametric Modules" ICFP '01 Sep. 3-5, 2001 Copyright 2001 ACM 1-58113-415-0/01/0009 pp. 98-109.

Dayton Linnea and Jack Davis; "Photo Shop 5/5.5 WOW! Book" 2000 Peachpit Press pp. 8-17.

Hall Richard Scott; "Agent-based Software Configuration and Deployment" Thesis of the University of Colorado Online Dec. 31, 1999 retrieved from the Internet on Nov. 7, 2003: <http://www.cs.colorado.edu/users/rickhall/documents/ThesisFinal.pdf> 169 pages.

Hardy Mathew R. B. et al; "Mapping and Displaying Structural Transformations between XML and PDF" DocEng '02 Nov. 8-9, 2002 Copyright 2002 ACM 1-58113-597-7/02/0011 pp. 95-102.

Kim Sang-Kyun et al.; "Immediate and Partial Validation Mechanism for the Conflict Resolution of Update Operations in XML Databases" WAIM 2002 LNCS 2419 2002 pp. 387-396 Springer-Verlag Berlin Heidelberg 2002.

Netscape Communication Corp; "SmartUpdate Developer's Guide" Online Mar. 11, 1999 retrieved from the Internet on Dec. 8, 2000: <http://developer.netscape.com:80/docs/manuals/communicator/jarman/index.htm> 83 pages.

Tomimori et al.; "An Efficient and Flexible Access Control Framework for Java Programs in Mobile Terminals"; 22nd International Conference on Distributed Computing Systems Workshops; 2002; pp. 777-782.

Van Hoff Arthur et al.; "The Open Software Description Format" Online Aug. 13, 1997 retrieved from the Internet on Nov. 7, 2003: <http://www.w3.org/TR/NOTE-OSD> 11 pages.

Verlamis Iraklis et al.; "Bridging XML-Schema and relational databases. A System for generating and manipulating relational databases using valid XML documents." DocEng '01 Nov. 9-10, 2001 Copyright 2001 ACM 1-58113-432-0/01/0011 pp. 105-114.

Williams Sara and Charlie Kin; "The Component Object Model: A Technical Overview" Oct. 1994 Microsoft Corp. pp. 1-14.

Pacheco et al., "Delphi 5 Developer's Guide," Sams Publishing, 1999, Chapter 31 Section: Data Streaming, 6 pages.

"Netscape window," Netscape Screenshot Oct. 2, 2002.

Clarke P., "From small beginnings" Knowledge Management Nov. 2001, pp. 28-30.

Hwang et al., "Micro-Firewalls for Dynamic Network Security with Distributed Intrusion Detection"; IEEE International Symposium on Network Computing and Applications; 2001; pp. 68-79.

Kaiya et al., "Specifying Runtime Environments and Fuctionalities of Downloadable Components Under the Sandbox Mode"; International Symposium on Principles of Software Evolution; 2000; pp. 138-142.

Komatsu N. et al., "A Proposal on Digital Watermark in Document Image Communication and Its Application to Realizing a Signature" Electronics and Communications in Japan Part I: Communications vol. 73 No. 5, May 1990, pp. 22-33.

Sun Q. et al., "A robust and secure media signature scheme for JPEG images" Proceedings of 2002 IEEE Workshop on Multimedia Signal Processing, Dec. 2002, pp. 296-299.

Prevelakis et al., "Sandboxing Applications"; Proceedings of the FREENIX Track; 2001; pp. 119-126.

Schmid et al., "Protection Data from Malicious Software"; 18th Annual Computer Security Applications Conference; 2002; pp. 199-208.

W3C Editor James Clark and Ste; "XML Path Language (XPath) Version 1.0" Nov. 16, 1999W3C (MIT INRIA Kejo) pp. 1-49.

Rapaport L; "Get more from SharePoint" Transform Magazine vol. 11 No. 3. Mar. 2002 pp. 1315.

Clark James—W3C Editor; "XSL Transformation (XSLT) Version 1.0" Nov. 16, 1999 W3C (MIT INRIA Kejo) pp. 1-156.

Description of Whitehall Composer software product producted by Whitehall Technologies Inc. available at <http://www.xml.com/pub/p/221> accessed on Apr. 8, 2004, two pages.

McCright J.S.; "New Tool Kit to Link Groove with Microsoft Sharepoint" eWeek Enterprise News & Reviews Ziff Davis Media INc. Jul. 29, 2002 1 page.

Musgrave S; "Networking technology—impact and opportunities" Survey and Statistical Computing 1996. Proceedings of the Second ASC International Conference. Sep. 1996. pp. 369-378. London UK.

Atova, "User Reference manual Version 4.4, XML Spy suite 4.4," Atova Ges.m.b.H and Altova, Inc., May 24, 2002, pages cover, copyright page, 1-565.

Altova et al. XML Spy, XML integrated Development Environments, Altova Inc., 2002, pp. 1-18.

Ben-Natan, U.S. Appl. No. 60/203,081, filed May 9, 2000, entitled "Internet platform for creating and supporting communities".

Han et al., WebSplitter: A Unified XML Framework for Multi-Device Collaborative Web Browsing, 2000, ACM Conference on Cimputer Supported Cooperative Work, 10 pages.

IBM: Stack Algorithm for Extractin Subtree from Serialized Tree, Mar. 1, 1994, TDB-ACC-NONN94033, 3 pages.

Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, download pp. 1-16.

Kutay, U.S. Appl. No. 60/209,713 filed Jun. 5, 2000, entitled, "Methods and systems for accessing, organizing presenting and viewing data".

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662 filed Mar. 23, 2000, entitled "Collection-based presistent digital archives".

Cover, XML Forms Architecture, retrieved at << http://xml.coverpages.org/xfa.html>> on Aug. 17, 2006, Coverpages, Jun. 16, 1999.

Raggett, "HTML Tables", retrieved on Aug. 6, 2006, at <<http:www.//is-edu.hcmuns.edu.vn/WebLib/books/Web/Tel/html3-tables.html>>, W3C Internet Draft, Jul. 7, 1995, pp. 1-12.

"Webopedia Computer Dictionary" retrieved on May 9, 2006, at <<http://www.pewebopedia.com/TERM/O/OLE. html>>, Jupitermedia Corporation, 2006, pp. 07.

Microsoft Corporation, "Microsoft Computer Dictionary" Microsoft Press, Fifth Edition, p. 149.

Grosso, et al., "XML Fragment Interchange", W3C,(Feb. 2001), 1-28.

Altova, et al., "User and Reference Manual Version 4.4", www.xmlspy.com, (May 24, 2007), 1-565.

"XForm 1.0", W3C,(Jul. 16, 2001).

* cited by examiner

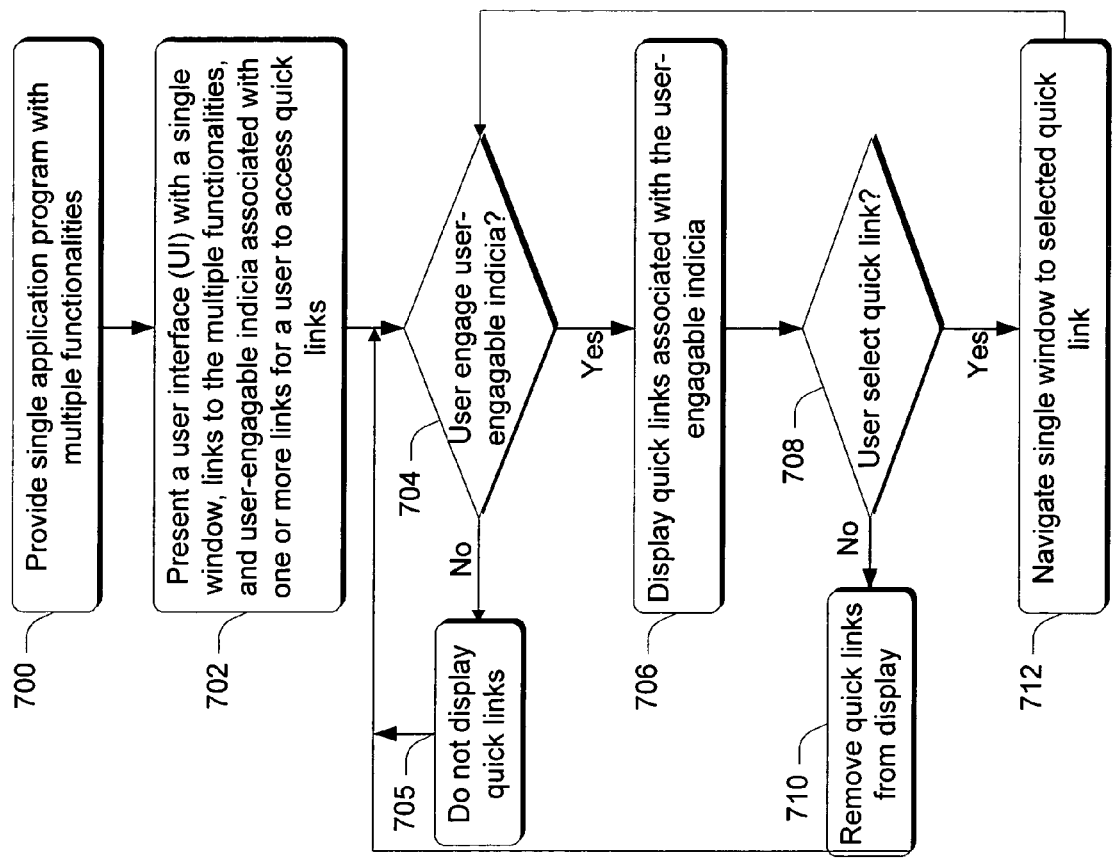

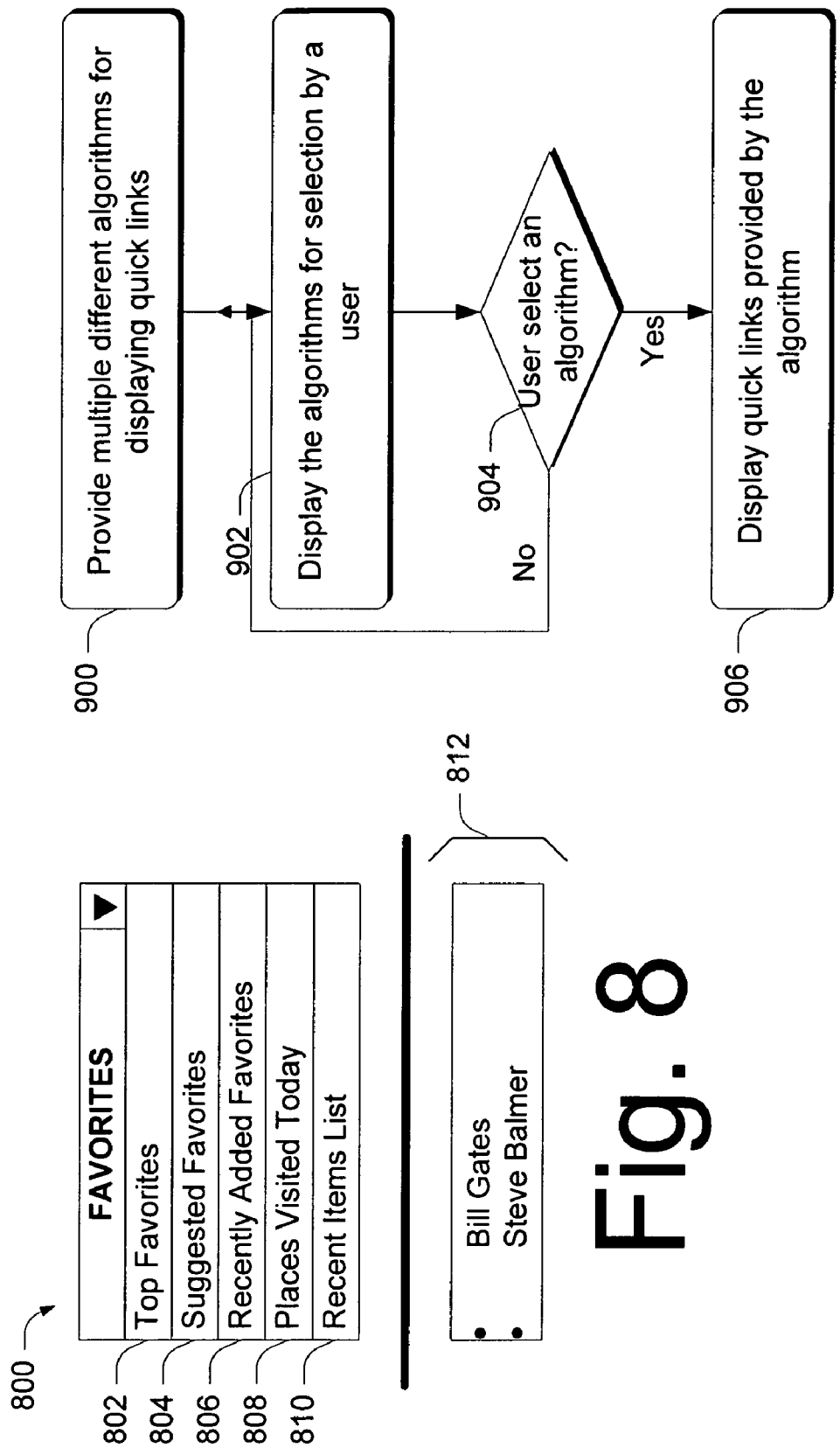

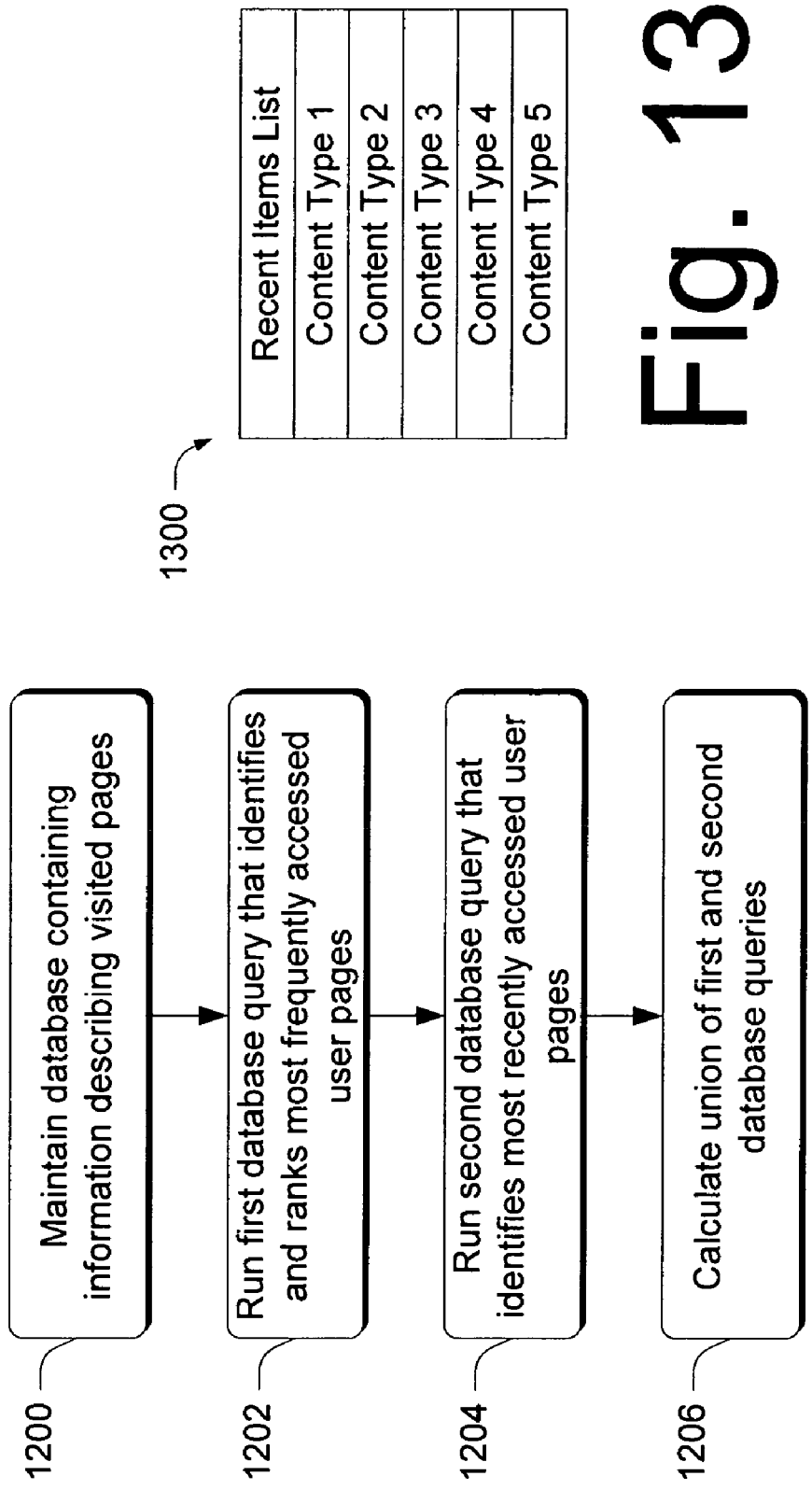

METHODS AND SYSTEMS OF PROVIDING INFORMATION TO COMPUTER USERS

RELATED APPLICATIONS

This application is a continuation of and claims priority to U.S. patent application Ser. No. 11/056,439, filed on Feb. 11, 2005 which is, in turn, a divisional of and claims priority to U.S. patent application Ser. No. 09/599,806, filed on Jun. 21, 2000 now U.S. Pat. No. 6,948,135, the disclosures of which are incorporated by reference herein.

The following patent applications are related to the present application, are assigned to the assignee of this patent application, and are expressly incorporated by reference herein: U.S. patent application Ser. No. 09/599,298, entitled "Single Window Navigation Methods and Systems"; U.S. patent application Ser. No. 09/599,299, entitled "Methods, Systems, Architectures and Data Structures For Delivering Software via a Network"; U.S. patent application Ser. No. 09/599,048, entitled "Network-based Software Extensions"; U.S. patent application Ser. No. 09/599,813, entitled "Authoring Arbitrary XML Documents using DHTML and XSLT"; U.S. patent application Ser. No. 09/599,812, entitled "Architectures For And Methods Of Providing Network-based Software Extensions"; and U.S. patent application Ser. No. 09/599,086, entitled "Task Sensitive Methods And Systems For Displaying Command Sets".

TECHNICAL FIELD

This invention pertains to computerized methods and systems for providing information to computer users. More particularly, the invention concerns methods and systems for providing links to user-specific information.

BACKGROUND

As computing evolves, there is a growing demand to make the user's computing experience much more user-centric, or tailored to the particular user. Consider, for example, web browsers. Web browsers are application programs that execute on a user's computer and enable a user to navigate the web and search for content, typically in the form of web pages that are displayed on their computer. To make the user's web browsing experience more user-centric, most web browsers include what is known as a "add favorite" function in which a user can add particular web sites to a "favorites" list. When a user adds a web site or web page to their favorites list (in the form of a link), they physically create an entry in a database that maintains a URL (i.e. universal resource locator) associated with the web site or page. Anytime a user wishes to return to one of these web sites or pages, they simply pull up their "favorites" list, click on the appropriate link, and their web browser obtains and displays a web page that corresponds to the link.

Another way that web browsers attempt to create a user-centric experience is by keeping track of a very limited amount of so-called "history data" pertaining to the user's historical browsing activities. History data might include the last three web sites that were browsed by the user. The user can typically view this information by clicking on a feature that provides a drop down menu that lists links to the browsed sites. For example, on the web browser's navigation bar, there is typically a "back" and "forward" button that can be clicked by the user to navigate backward or forward among entries that are maintained in a navigation stack that keeps track of the user's browsing activities. The "back" and "forward" buttons can also have drop down menus associated with them that enable the user to display a drop down menu that might include links for the last three sites that the user encountered. By selecting one of these links, the user's browser displays the corresponding web page.

While these solutions provide a very basic user-centric functionality, they fall far short of providing a versatile, intelligently flexible and dynamic system. For example, many of these systems require the user to initiate or take some action in order for particular links to appear (i.e. the user necessarily must add a link to their favorites list). In addition, many of these systems are unintelligent in the way that they present information or links to the user. For example, a favorites list may have a large number of links that have been added by the user. When a user attempts to find a link to a favorite web site, their browser will typically present them with all of the links that are in their favorites list. It is then up to the user to find the appropriate link so that they can select it.

Another challenge in the general area of information use is that which is posed by the move toward context-aware computing systems. Context-aware computing systems are those systems that provide services to a user based upon their context. In the future, information processing systems are going to have to be sensitive to the user's desire to accomplish tasks in context-aware systems. For example, it may be desirable to provide services to a user without requiring the user to change their context in order to consume the services. As an example, consider the following scenario. A user is working in a word processing application on a particular document of interest. The document is provided by an application program that is executing on the user's computer and that displays the document in a window that is defined by the program. Consider now that the user receives four or five email messages during the course of working on the document. In order to view indicia of these email messages (i.e. the "From" and "Subject" fields), in today's computing environment, the user is typically required to pull up their email application program which separately displays a different window that includes the indicia that the user wishes to view. This is a "modal" operation in that the user is required to temporarily quit working on their document in the word processing application program so that they can view information provided by the email application program. Thus, the user is undesirably required to change their context.

This invention arose out of concerns associated with improving methods and systems that provide information to computer users.

BRIEF DESCRIPTION OF THE DRAWINGS

FIG. 7 is a flow diagram that describes steps in a method in accordance with one described embodiment.

FIG. 8 is a diagram of an exemplary user favorites interface.

FIG. 9 is a flow diagram that describes steps in a method in accordance with one described embodiment.

FIG. 12 is a flow diagram that describes steps in a method in accordance with one described embodiment.

FIG. 13 is a diagram that illustrates the concept of a "Recent Items List."

DETAILED DESCRIPTION

Overview

Figure 1:
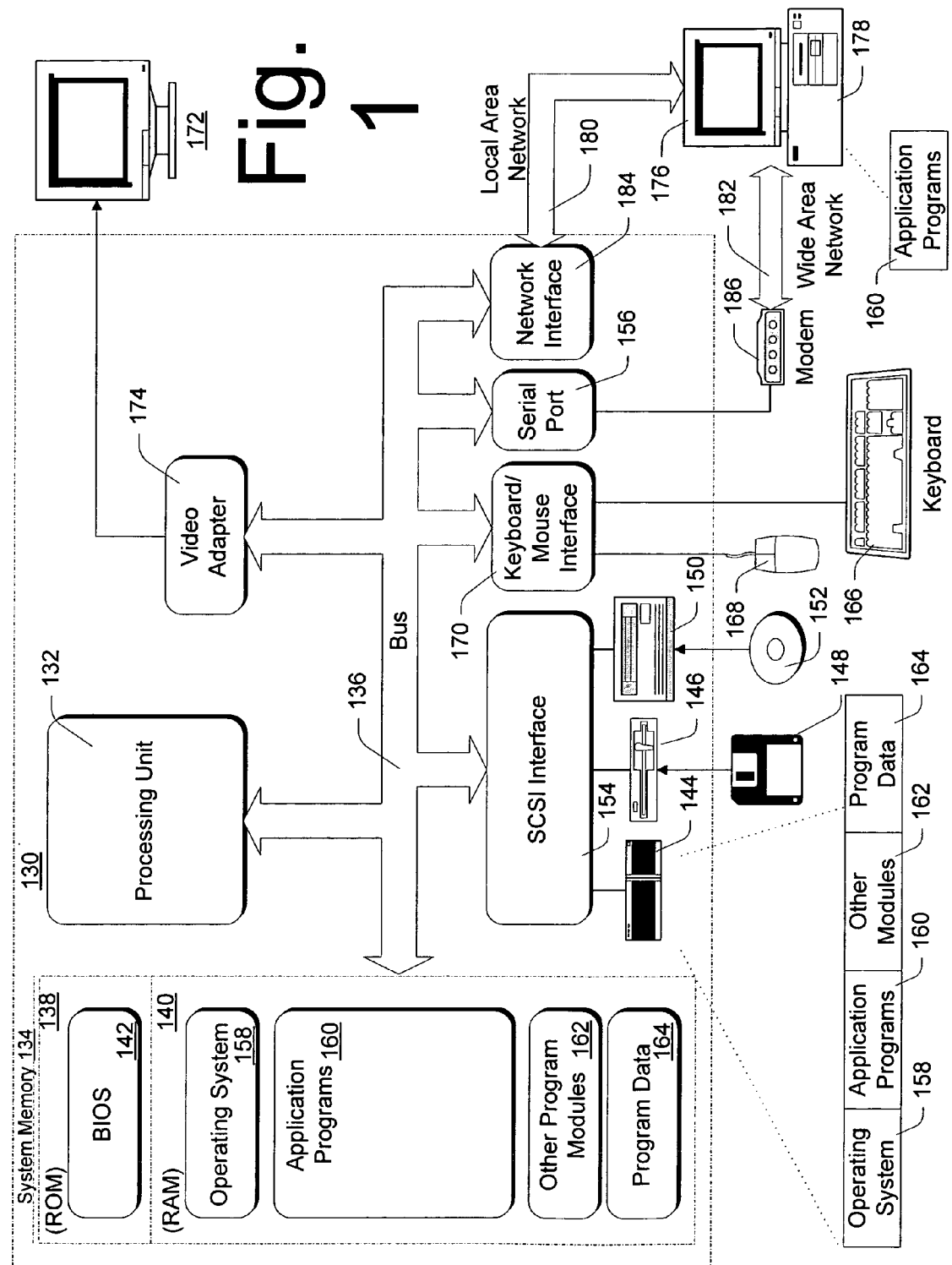
FIG. 1 is a block diagram of an exemplary computer system that can be used to implement various described embodiments.

In various embodiments described just below, novel methods and systems provide so-called browsable "quick links" to user-related data. The quick links can be advantageously deployed in a manner in which the user can browse the quick links without having to change or modify their current computing context. The quick links can be provided across multiple different content types, e.g. document types. Thus, a user can, in some instances, view quick links associated with different content types without having to change their current computing context, i.e. without having to change a document of a particular content type in which they happen to be working.

In one particularly advantageous embodiment, multiple different functionalities can be provided by a single application program. The multiple different functionalities enable a user to accomplish multiple different tasks within the context of a single application program. This single application program might, for example, provide multiple document-centric functionalities, e.g. an email functionality, word processing functionality, and web browser functionality. In this example, a user working within the web browser functionality can view quick links associated with the email functionality without having to change their web browsing context. A user is then able to select a link to automatically navigate to a particular document that is associated with that link.

Another aspect of some of the described embodiments includes an ability to build the quick links using dynamically-changing information that is not necessarily information that is demanded by the user. That is, in many systems, information will be received that pertains to a particular user. For example, in a single application program that includes an email functionality, a user may, over the course of browsing web sites, receive one or more email messages. These email messages constitute dynamically-changing information which, in this example, is not related to any actions that the user is taking. Nonetheless, quick links to the email messages can be advantageously displayed for the user while they are in the context of their web browsing activities.

Other embodiments provide intelligent browsing algorithms that are directed to displaying quick links that are very likely to be of interest to a user. These intelligent browsing algorithms can be advantageously deployed in connection with multiple content-type systems so that the algorithms are adaptable to and address the different content types.

Thus, the described embodiments provide very powerful methods and systems that greatly enhance the user's computing experience by, among other things, specifically tailoring the user's computing experience to their particular context. Flexibility is enhanced by providing, in some instances, systems that are configured to work within a context-sensitive computing environment that contains multiple different functionalities that are selectable for use by a user.

Exemplary Computer System

FIG. 1 shows an exemplary computer system that can be used to implement the embodiments described herein. Other computer systems can, however, be used. Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Viewable Links Across Multiple Content Types

In one embodiment, software provides various quick links that are viewable by a user without changing their current computing context. The quick links can advantageously pertain to another context that is different from a context in which the user is currently computing. For purposes of this document, a "context" can be considered as a functionality that enables a user to complete a particular computing task. Exemplary contexts include, without limitation, word processing contexts, browsing contexts, email contexts and the like. Thus, while a user is in one particular context, they have the ability to view quick links that pertain to another different context without changing their current computing context.

As an example, consider the following. A user is currently working on a document in a word processor. During the course of working on the document, the user receives an email message from a friend. In the past, the user would have to temporarily stop their current computing context, e.g. by exiting or pausing a word processing window, and pulling up an email window to view indicia of the email message (i.e. the "From" and "Subject" fields). In accordance with this example, a user can view quick link that are associated with the different context without changing their current context. In this specific case, the user can view links that are associated with the email message (e.g. the "From" and "Subject" fields) without exiting the word processing window or changing their word processing context.

Figure 2:
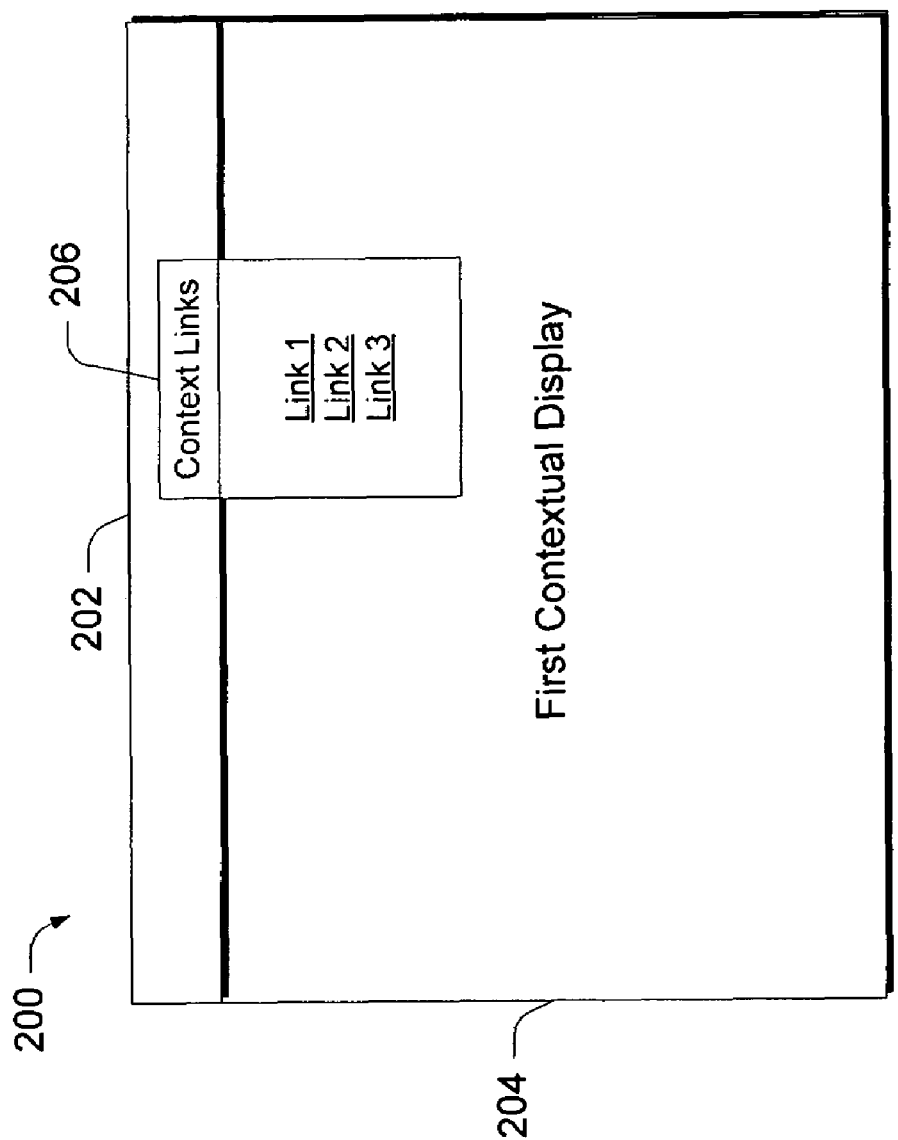
FIG. 2 is a diagram of an exemplary user interface that can be provided in accordance with one described embodiment.

FIG. 2 shows but one exemplary user interface 200 that can be provided in accordance with this example. The user interface is implemented in software that is executable on a user's computing device, e.g. a personal computer, although any computing device can suffice. Interface 200 includes, in this example, a tool bar 202 and a display area 204. Display area 204 can be used by the user to engage in tasks associated with a first context and, in this example, is designated "First Contextual Display." Exemplary tasks can be any suitable tasks in which a computer can engage. Exemplary non-limiting tasks were mentioned above. Tool bar 202 includes, in this example, user-engagable indicia 206 that can enable a user to view quick links that are associated with one or more contexts that are different from the first context and each other. In this example, the indicia comprises one or more drop down menus 206. Each drop down menu can be associated with a different context, i.e. different task, in which a user can engage. In this particular example, and for the sake of brevity, only one indicia or drop down menu is shown.

In operation, a user who is working within a particular context in display area 204 may desire to view links associated with a different context. In this case, the user simply clicks on the drop down menu 206 to automatically view one or more quick links that are associated with a different context. When the user clicks on the menu 206, their context within the display area does not change. That is, they are able to view the quick link or links associated with the different context or contexts, without having to change their own context. To this extent, the display of the quick links associated with the other context is done in a modeless fashion. That is, when the user displays the quick links, they are not required to temporarily leave their current context. They may continue working within or at least view their current context in the display area 204 while the quick links are displayed.

As an example, consider again the user who is working in a word processor on a particular document and receives an email message from a friend. Instead of having to leave the current document displayed in display area 204, the user simply clicks on the menu 206 to view of list of quick links that correspond to the email messages that the user has received. In this way, the user can check their list of email messages (or view links that pertain to one context) while working in a completely different context. The user can then click on a quick link to be navigated to the new context which, in this case, is the email message.

Figure 3:
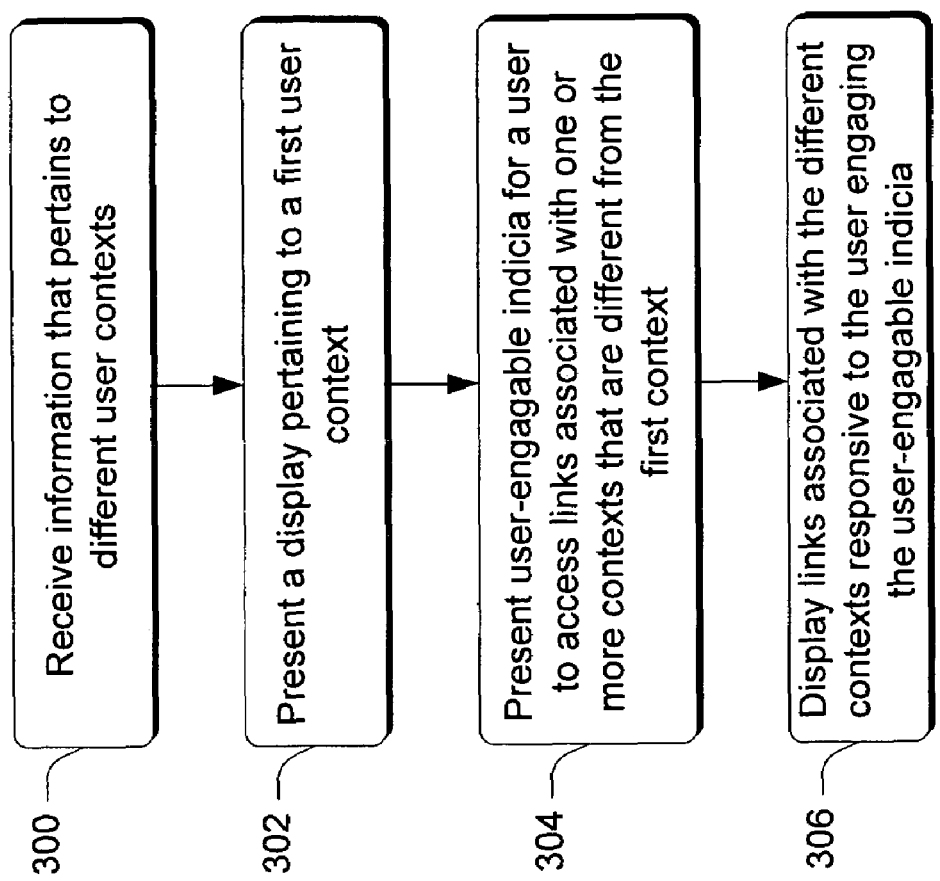
FIG. 3 is a flow diagram that describes steps in a method in accordance with one described embodiment.

FIG. 3 is a flow diagram that describes steps in a method in accordance with the described embodiment. The illustrated method can be implemented in any suitable hardware, software, firmware, or combination thereof. In the illustrated example, the method is implemented in software.

Step 300 receives information that pertains to different user contexts. This information can comprise any information that can be associated with any number of different user contexts. Advantageously, the information can comprise dynamically changing information. For example, the information can comprise "incoming" information that is received by the user's computer while the user is working within one context (e.g. receiving an email message while working in a word processing document). Such information can also comprise information that is or is not generated by the user themselves. The information can also comprise time-sensitive information (e.g. calendar appointments for a particular day or time frame), in which case the information would appear when the appointments start in the immediate future. Further, the information can comprise information concerning content that the user is working with and information about the content's use. Step 302 presents a display on the user's computer that pertains to a first user context. The display can be any suitable display with which the user can interact to accomplish a task. Step 304 presents user-engagable indicia that enables a user to access quick links associated with one or more contexts that are different from the first context. The links can be associated with the information that is received at step 300. Any suitable user-engagable indicia can be presented. In the example given above, the indicia is displayed in the form of a drop down menu. Step 306 displays quick links that are associated with the different contexts responsive to a user engaging the user-engagable indicia. In the above example, this step can be implemented when the user clicks on the drop down menu that is associated with the different contexts. Advantageously, steps 304 and 306 are implemented without changing the user's present computing context. So, in the above example, this step is implemented by displaying quick links to the user's incoming email messages without requiring the user to change their word processing context.

Exemplary Implementation

In accordance with one specific implementation, software provides a user interface (UI) that presents a user with a single navigable window that can be navigated between multiple different functionalities by a user. The single navigable window and different functionalities are advantageously provided by a single application program which greatly facilitates integration of the different functionalities. The single navigable window contains user-engagable indicia that enables a user to view quick links that are associated with different functionalities, without having to change their current context or functionality. An exemplary single navigable window application is described in the U.S. patent application entitled "Single Window Navigation Methods and Systems", incorporated by reference above.

In the exemplary single navigable window application, a user, through the use of various navigation instrumentalities, can navigate between the functionalities and when doing so, the single window presents one of these functionalities. When this one functionality is presented to the user, the user is able, through the use of the user-engagable indicia, to view quick links associated with one or more of the other functionalities. In this particular implementation, one navigation instrumentality is provided in the form of a web browser-like navigation tool. The choice of a web browser-like navigation tool follows from concerns that navigation instrumentalities be of a type that is readily understood by most individuals familiar with computing environments. Thus, when a user first encounters the inventive navigable single window concept for the first time, they do not have to learn an unfamiliar navigation concept. Another navigation instrumentality includes links to each of the multiple different functionalities. These links are different from the quick links and can be clicked on by a user to automatically navigate the single navigable window to a selected functionality. Once the user has navigated the single window to a particular functionality, they can set about accomplishing a task within the functionality. One or more of the application links includes the user-engagable indicia that, in turn, displays the quick links to the associated functionality.

Figure 4:
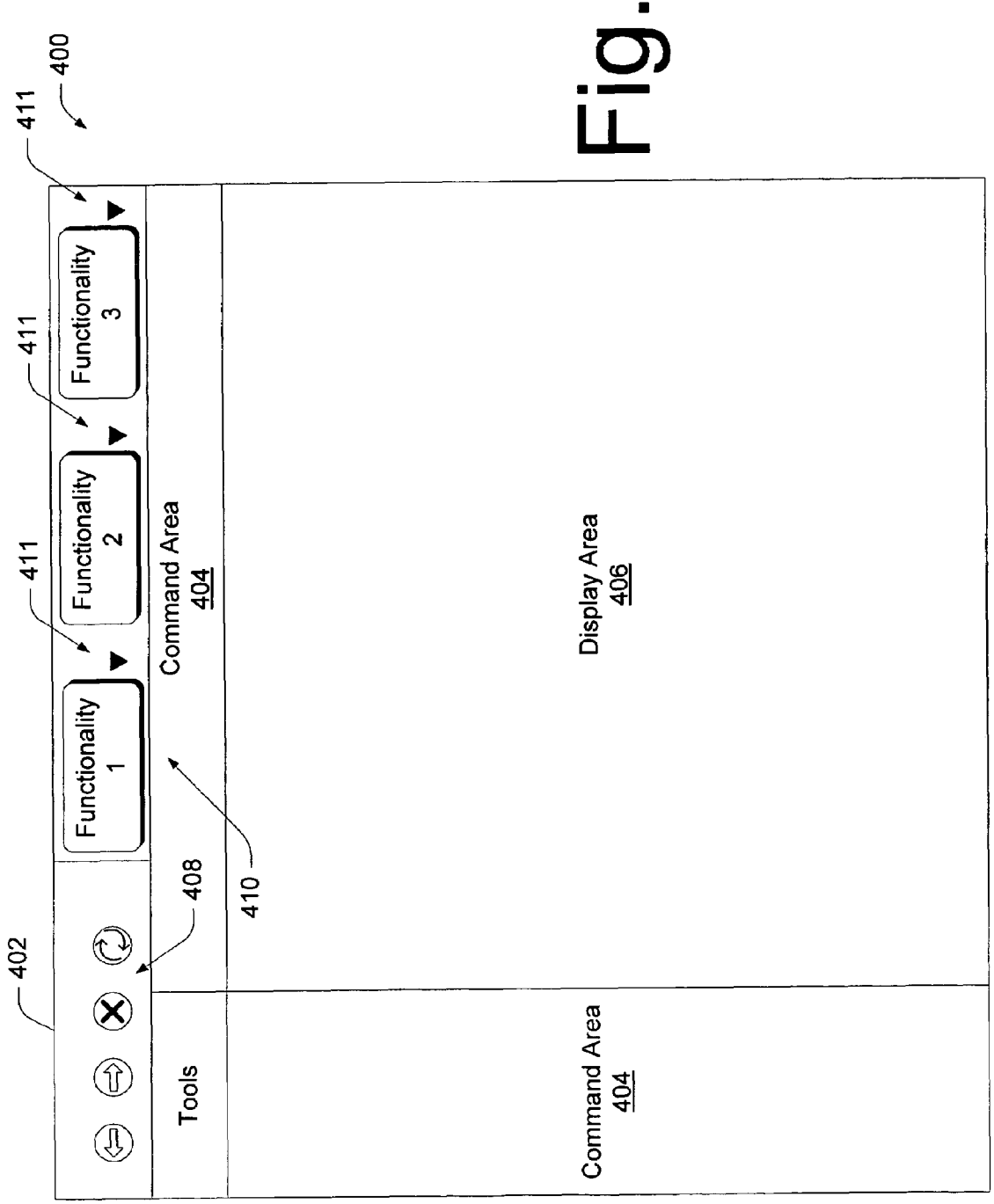
FIG. 4 is a diagram of an exemplary user interface in accordance with one specific implementation.

FIG. 4 shows but one exemplary user interface (UI) 400 in accordance with this specific implementation. It will be appreciated that other UIs could be used to implement the inventive concepts described herein and that the illustrated UI constitutes but one way of doing so. In the illustrated example, UI 400 includes a navigation bar 402, one or more command areas 404, and a display or document area 406 that constitutes the single navigable window.

Navigation bar 402 is located adjacent the top of display area 406 and contains browser-like navigation buttons 408 in the form of a "backward" button, a "forward" button, a "stop" button and the like. The navigation bar can be located anywhere on the UI. Its illustrated placement, however, is similar in appearance to the placement of traditional web browsing navigation features. In addition to the navigation buttons 408, the navigation bar 402 also includes one or more links 410 to the different functionalities that are provided by the single application program and which can be accessed by the user. Individual links 410 have user-engagable indicia 411 associated with them that enable a user to view quick links that are associated with the functionality. In the illustrated example, links to three exemplary functionalities (i.e. functionality 1, functionality 2, and functionality 3) are shown and each has its own user-engagable indicia 411. It is possible, however, for less than all of the functionalities to have user-engagable indicia These functionalities are typically different functionalities that can enable a user to complete different respective tasks. Examples of different tasks are given below in more detail. In this example, these functionalities are advantageously all provided within the context of a single application.

In operation, to access a particular functionality, a user simply clicks on one of the links 410 and a display that pertains to the selected functionality is immediately presented in the single window display area 406. To view quick links that are associated with a particular functionality that is the same as or different from one in which the user is currently working, the user simply clicks on the corresponding user-engagable indicia 411 to see a drop down menu containing the quick links. Thus, while working within functionality 1, for example, the user could click on the user-engagable indicia 411 associated with any of functionalities 1, 2 and 3 to see their associated quick links. By clicking further on any of the quick links, the user can automatically navigate the single window to that particular link. As the user navigates from link to link or from functionality to functionality, their navigation activities are managed by a software-implemented navigation model that is described in a section entitled "Navigation Model" below.

Command areas 404 are located adjacent the top and left side of the display area 406. The command area(s) can, however, be located in any suitable location. The command areas provide commands that are both global in nature and specific to the particular context the user has selected. For example, some commands such as "search" and "help" might be considered as global in nature since they can find use in many contexts. Other commands, such as "text bold" or "forward" are more specific to the particular context that the user has selected. For the "text bold" command, the user's context may likely be a word processing context, while the "forward" command may likely be employed in an email context. The concept of context-sensitive command structures are described in more detail in the U.S. patent application entitled "Task Sensitive Methods And Systems For Displaying Command Sets", incorporated by reference above.

Briefly, however, context-sensitive command structures include command sets having one or more individual commands are automatically presented to a user depending on the user's context. Specifically, depending on the type of action the user has taken within display area 406, commands that are specific to that action will appear automatically thus obviating the need for the user to hunt through a menu structure to find commands of interest. This improves upon past approaches which always presented top level commands, even when they were not needed by the user. This is also advantageous from the standpoint of assisting users who are unfamiliar with a particular software application. In the past, these users would have to hunt through an unfamiliar menu structure to find commands that may or may not be pertinent to an action that the user desired to take. In the present case, contextually-appropriate commands are automatically presented in an interface so that a user need not worry about finding appropriate commands.

In the present example, a context-sensitive command structure in the form of a context block can be presented to the user. The context block can advantageously contain multiple algorithms from which the user can select to see different collections of links that pertain to the particular functionality in which they are currently working or one or more of the functionalities in which they are not currently working. The algorithms are designed to intelligently present links that are very likely to be of interest to the user. Exemplary algorithms are described in more detail in the "Exemplary Algorithms" section below.

EXAMPLE

Figure 5:
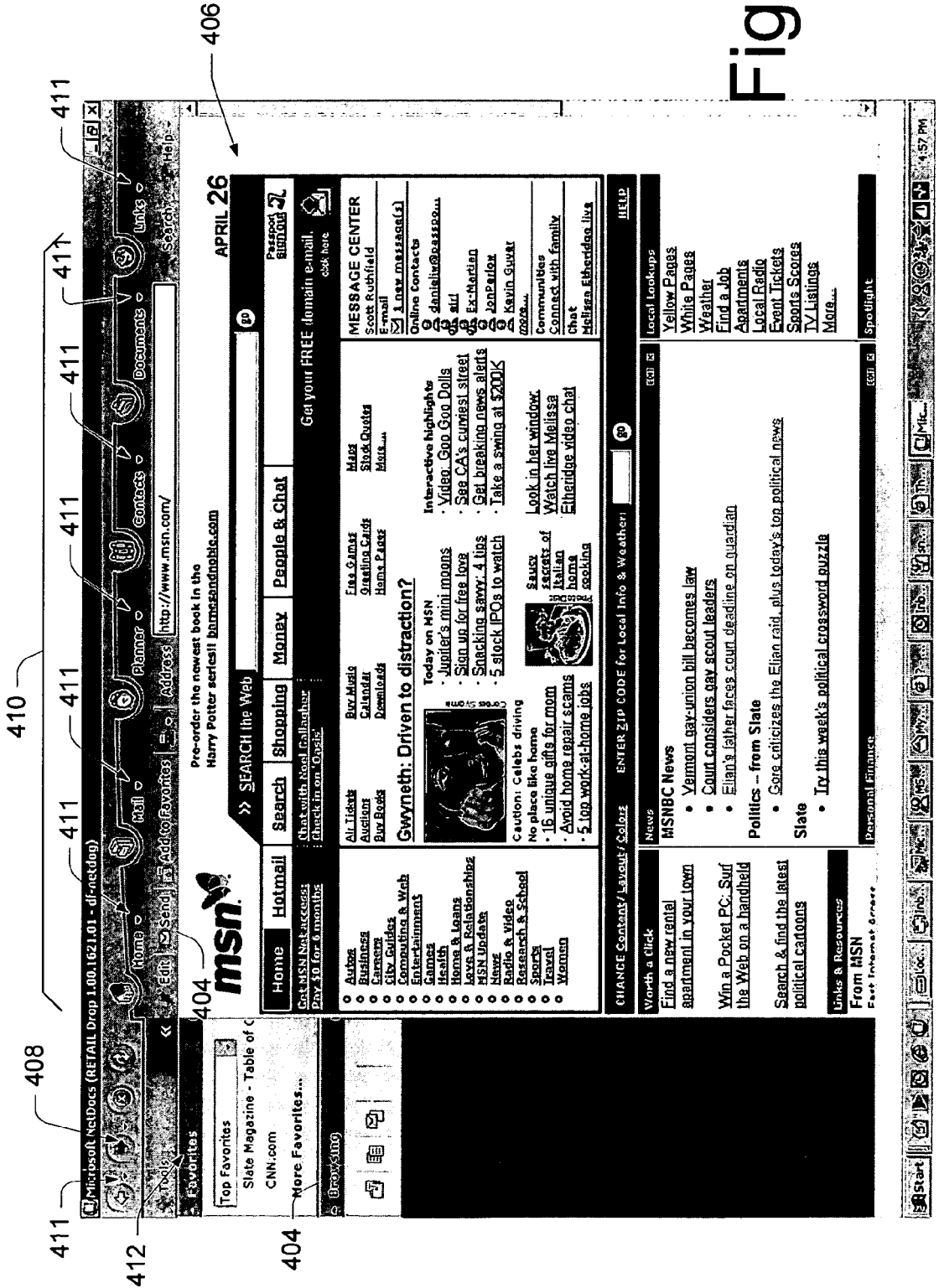
FIG. 5 is a diagram of an exemplary user interface in accordance with one specific implementation.
Figure 6:
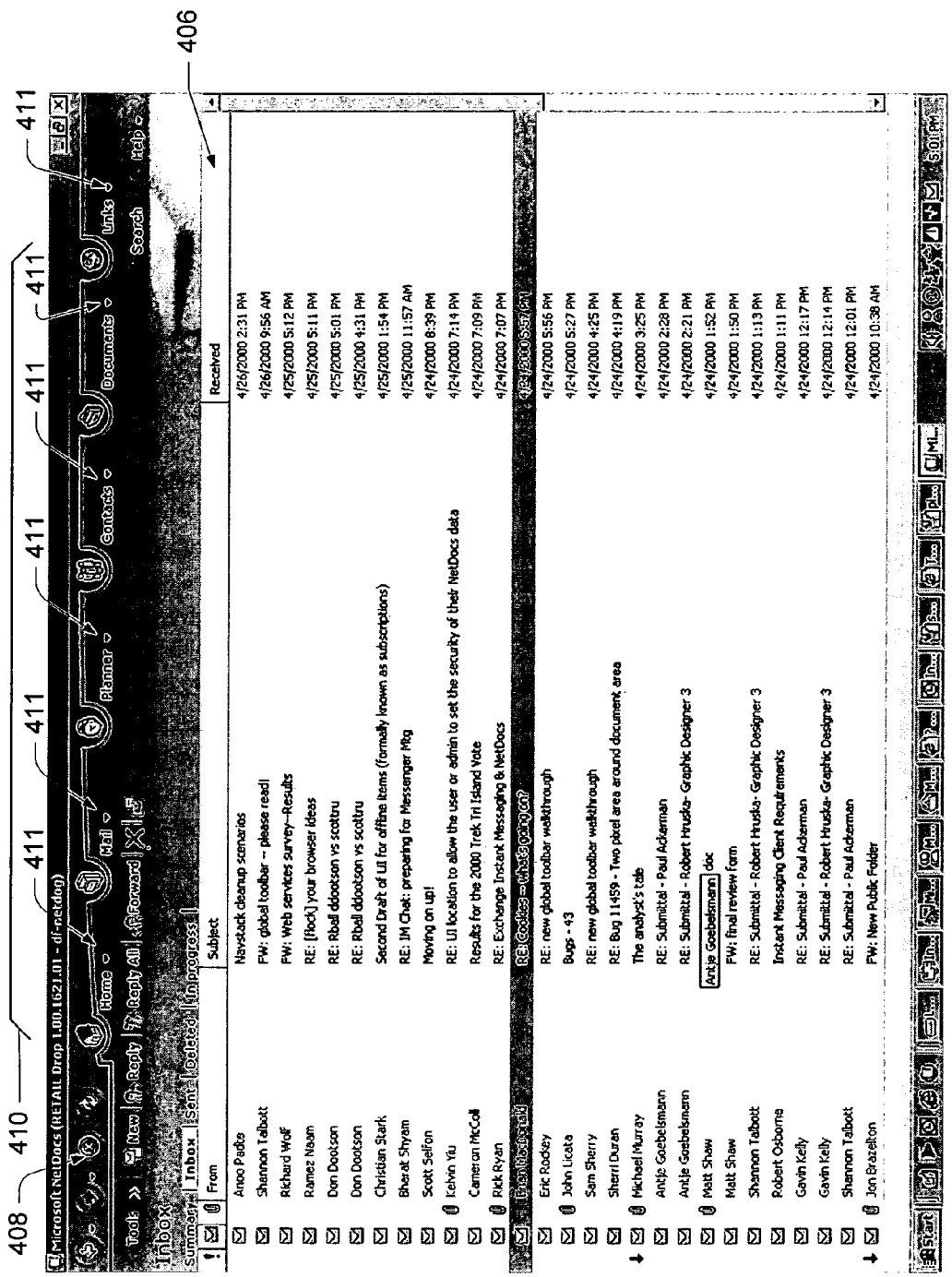
FIG. 6 is a diagram of an exemplary user interface in accordance with one specific implementation.

As an example of the single navigable window provided by a single application consider FIGS. 5 and 6.

In this example, the multiple functionalities 410 that can be navigated by a user include a browser functionality (indicated by the home icon), a mail functionality (indicated by the letter icon), a planner functionality (indicated by the clock icon), a contacts functionality (indicated by the people icon), a documents functionality (indicated by the folder icon), and a links functionality (indicated by the world icon). These illustrated functionalities are so-called "document-centric" functionalities because they are defined around a type of document that a user interacts with, e.g. a Web page document, an email document, a calendar document, etc. Each of the links 410 to the functionalities has an associated user-engagable indicia 411 in the form of a drop down menu that shows quick links to the various functionalities.

FIG. 5 shows an example of a display that is rendered in the display area 406 when a user clicks on the link to the browser functionality. By clicking on the link (i.e. the home icon) to the browser functionality, single application program software executing on the user's computer executes to implement a browser functionality. In this example, the browser functionality displays the user's home page in display area 406. Notice also that navigation buttons 408 are provided for navigation within the current and between the different selectable functionalities. The command areas 404 contain command sets that include commands that are specific to the context that the user has selected. In this example, the user's context is a browsing context. Accordingly, the leftmost command area contains commands that are specific to the browsing functionality. Such commands include ones that a user would normally expect to find in a web browser. In addition, the leftmost command area 404 shows a context block 412 labeled "Favorites" that includes a drop down menu that can enable a user to select between multiple different algorithms that intelligently present links associated with their current context. In this example, context block 412 indicates that the user has selected a "Top Favorites" algorithm that lists their top favorite web sites. An exemplary "Top Favorites" algorithm is described below in the "Exemplary Algorithms" section.

Notice also that the command area 404 adjacent the top of display area 406 also contains commands that are specific to the browsing context, i.e. "Add to Favorites" and an address well in which the user can type a URL of a particular destination web site.

FIG. 6 shows an example of a display that is rendered in the display area 406 when the user clicks on the link to the mail functionality (i.e. the folder icon). By clicking on this link, single application program software executing on the user's computer executes to implement the mail functionality. In this example, the mail functionality displays a user's in box with messages that have been received by the user. Notice that the leftmost command area has been minimized by the user and that the command area adjacent the top of the display area 406 contains commands that are specific to the user's current context, e.g. "New" for generating a new email message, "Reply" for replying to an email message, "Reply to All" for replying to all recipients of an email message and the like.

Likewise, although not specifically illustrated, the user could have displays for the planner, contacts, documents, and links functionalities presented in the display area 406 by simply clicking on the links to these specific functionalities. The navigation bar 408 provides the user with the ability to navigate through these different functionalities in a browser-like manner.

It is important to note that the above example constitutes but one exemplary way in which multiple different functionalities and associated quick links can be presented to a user within the construct of a navigable structure. It should be understood that the specifically illustrated functionalities (i.e. browser, mail, planner etc.) constitute specific examples of different functionalities that are capable of being incorporated into the single application program that provides the navigable window and should in no way limit the scope of the claimed subject matter to only the specifically illustrated and described functionalities. Accordingly, other different functionalities and associated quick links can be employed.

FIG. 7 is a flow diagram that describes steps in a method in accordance with this described embodiment. The illustrated method can be implemented in any suitable hardware, software, firmware, or combination thereof. In the illustrated example, the method is implemented in software.

Step 700 provides a single application program with multiple different functionalities. The functionalities, as pointed out above, are advantageously different so as to enable a user to accomplish different tasks. One specific non-limiting example of different functionalities was given above in the context of document-centric functionalities that enable a user to make use of browser, mail, planner, contacts, documents, and links functionalities. Step 700 can be implemented by configuring a computing device, such as a user's computer, with the single application program having the multiple different functionalities. This step can also be implemented by providing a software platform in the form of a generic single application shell that is extensible and adaptable to receive different extensions or software modules that embody various different functionalities as described in the U.S. patent applications entitled "Single Window Navigation Methods and Systems", "Methods, Systems, Architectures and Data Structures For Delivering Software via a Network", and "Network-based Software Extensions" incorporated by reference above. These different extensions are then presented to the user in the context of the single application having the multiple different functionalities.

These extensions can be delivered to the platform in any suitable way and through any suitable delivery mechanism. For example, one way of delivering the various extensions or functionalities is to deliver them via a network such as an Intranet or the Internet. Regardless of the manner in which the single application is provided, step 702 presents a user interface (UI) with a single window, links to the multiple different functionalities, and user-engagable indicia associated with one or more of the links. The user-engagable indicia, as described above, enables a user to access quick links associated with one or more of the functionalities. The UI can also advantageously include navigation instrumentalities that enable a user to navigate between the different functionalities in a browser-like manner. FIGS. 4-6 give specific examples of an exemplary UI that can be used in accordance with the described embodiment. Step 704 ascertains whether a user has engaged any of the user-engagable indicia for displaying the quick links. If the user has not engaged any of the user-engagable indicia, then step 705 does not display any of the quick links. The user-engagable indicia can be continually displayed so that a user is free to select one. If the user has engaged any of the user-engagable indicia (e.g. by clicking on a drop down menu 411 associated with one or more of the functionalities), then step 706 displays the quick links that are associated with the user-engagable indicia. Step 708 ascertains whether the user has selected a particular quick link from the displayed quick links. If the user has not, then step 710 can remove the display of quick links and branches back to step 704. This step can be implemented automatically (e.g. by removing the quick links display after a determinable amount of time) or manually (by enabling the user to close the quick links display through some predefined action). If the user has selected a particular quick link, then step 712 navigates the single window to the selected quick link and displays a document associated with the quick link for the user. Step 712 then returns to step 704. It will be appreciated that step 706 can also remove quick links that are displayed responsive to a user engaging the user-engagable indicia.

Hence, in this example, multiple different functionalities are provided by a single application program that provides a single navigable window that can be navigated among the different functionalites. This permits a user to accomplish different tasks without having to pull up and manage multiple windows. All of the functionalities, in this example, are provided within the single window as desired by the user. To assist the user in operating within the single window environment, one or more of the functionalities have user-engagable indicia associated with them that enables a user to view quick links that pertain to a functionality that is different from a functionality in which they happen to be working. Advantageously, the user is able to view the quick links without having to change their current context. For example, in the document-centric example described in FIGS. 5 and 6, a user can view quick links associated with upcoming appointments in their calendar functionality while browsing the web with their browser functionality. When they view the links to the appointments, their context remains within the browser functionality. If the user chooses, they may click on a particular quick link to an appointment which then changes their context and navigates the single navigable window to a document that displays more information about the appointment.

Navigation Model

In the embodiment described directly above, a navigation model is utilized to manage a user's navigation activities within the single application that provides the multiple different functionalities. Although any suitable navigation model (as will be understood by those of skill in the art) can be used, in the described embodiment a so-called "back-and-truncate" navigation stack is used. The basic concept of a back-and-truncate model is known and forms the basis for many different web browsers on the market today. Essentially, the back-and-truncate model makes use of a navigation stack that is truncated when the user navigates back n times and then forward to a new document. An explanation of the navigation model that is employed in the present example is given is the U.S. patent application entitled "Single Window Navigation Methods and Systems", incorporated by reference above.

Exemplary Algorithms

In one embodiment, various inventive algorithms are employed to ensure that the quick links that are displayed for the user are intelligently selected for display. Many of the algorithms use dynamically changing information as a basis for ascertaining what quick links to display for the user. Dynamically changing information can include such things as incoming information (e.g. information that is received by the user's computer) and information concerning future activities or events (e.g. calendar appointments). The dynamically changing information is processed by various algorithms to provide the quick links that can be selected for display for the user.

As an example, consider the document-centric single navigable window example above. In that example, the different functionalities include a planner functionality and an email functionality. The planner functionality typically employs information that can be considered as information concerning future activities or events. The email functionality employs information that can be considered as incoming information. The inventive algorithms take into account the nature of this information and attempt to provide an intelligently arranged collection of quick links for the user. Additionally, at least some of the inventive algorithms are employable across different content types. That is, some of the algorithms can provide quick links to different content types. An example of this is given in the "Recent Items List" section below.

The algorithms described below help to determine a set of quick links to provide for users. The inventive algorithms can work in multiple different ways. For example, the algorithms can work:

- As a filter or union of filters on a stored collection or collections of data (e.g. a collection of mail messages or web page favorites); or
- As data tracked in memory about a current application session, usually across multiple types of data (e.g. web pages, calendar appointments, and email messages, for example)

Multiple Selectable Algorithms

In one implementation, a user is presented, via a UI, with multiple algorithms from which they can select to have quick links displayed. The different algorithms can display different collections of quick links depending on the specifics of the algorithm selected by the user. Advantageously, the multiple selectable algorithms can be employed in connection with the single navigable window application described above. Hence, the different selectable algorithms can be employed across different content types.

Consider for example FIG. 8 which shows an exemplary user interface 800 designated as "Favorites". Interface 800 corresponds to the "Favorites" context block 412 of FIG. 5. Interface 800 includes multiple different algorithms that can be selected by a user. When a user selects a particular algorithm, they are presented with a display of quick links that are provided by that specific selected algorithm. In the illustrated example, four exemplary algorithms are shown: a "Top Favorites" algorithm 802, a "Suggested Favorites" algorithm 804, a "Recently Added Favorites" algorithm 806, a "Places Visited Today" algorithm 808, and a "Recent Items" algorithm 810. The "Top Favorites", "Suggested Favorites", and "Recent Items List" algorithms are discussed in specific sections below in more detail. It will be appreciated that the listed algorithms can be lo provided in any suitable way, e.g. in the illustrated UI or in drop down menus similar to the other quick links.

In the single navigable window implementation where a user's context is capable of changing from functionality to functionality, it is important to note that some of the different selectable algorithms, when selected by a user, provide quick links that are particular to the user's present context. That is, as the user's context changes from functionality to functionality, so too do the collection of quick links that are provided by some of the algorithms. For example, if a user is working in their email functionality, then by selecting "Top Favorites", they can see a list of their top favorite email messages. In the present example, their favorite email messages can be displayed directly under interface 800 in a display 812. If a user navigates to the web browser functionality and selects the "Top Favorites" algorithm, they can see a list of their top favorite web sites. Thus, the algorithms are capable of being employed in connection with and across different content types (e.g. email messages and web pages).

FIG. 9 is a flow diagram that describes steps in a method in accordance with this described embodiment. The illustrated method can be implemented in any suitable hardware, software, firmware, or combination thereof. In the illustrated example, the method is implemented in software.

Step 900 provides multiple different algorithms for displaying quick links. The algorithms that are provided can be any suitable algorithms. Advantageously, some if not all of the algorithms are designed to be employed in connection with and across different content types. In addition, some of the algorithms can display quick links to different content types, as will become apparent below in the "Recent Items List" section. Step 902 displays the multiple different algorithms for selection by a user. The algorithms can be displayed in response to the user actively pulling them up, or they can be displayed automatically when the user's context indicates that the algorithms might be useful to the user. Step 904 ascertains whether the user has selected an algorithm. A user can select an algorithm by simply clicking on the appropriate algorithm. If the user has not selected an algorithm, the method can branch back to step 902. Alternately, the method can remove the display of algorithms. If the user selects an algorithm, then step 906 displays quick links that are provided by the algorithm. The quick links can include links that are within the user's present context as well as links that are not within the user's present context.

Top Favorites

The inventive Top Favorites algorithm embodiments enable a user to see quick links that are associated with items on a favorites list that have been visited most often by the user as well as items that have most recently been added by the user to a favorites list. To determine which items have been visited "most" often by a user, any suitable metrics can be used. For example, one metric might look at a one-week or a one-month time period and set a predetermined threshold at ten. In this example, an item that is visited more than ten times in the defined time period would be considered as being an item that is visited most often. Similarly, to determine which items have been "most" recently added, any suitable metrics can be used, e.g. added within the past 2 or 3 days. This algorithm recognizes that items of particular interest to a user can include not only those items that a user visits frequently, but items that they recently added to their favorites list as well.

Figures 10, 11:
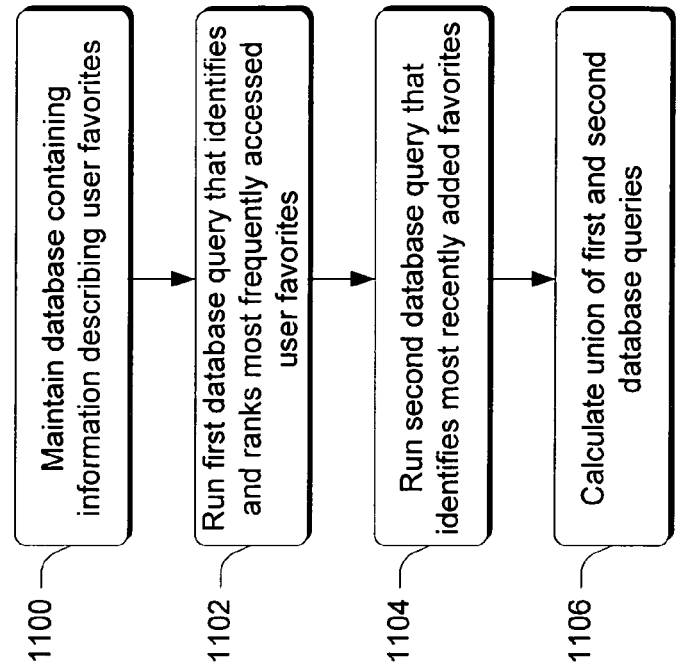
FIG. 10 is a diagram that describes a portion of a database in accordance with one described embodiment.
FIG. 11 is a flow diagram that describes steps in a method in accordance with one described embodiment.

The Top Favorites algorithm can be implemented as follows. A database maintains "favorite" entries in which a user has indicated an interest. The database can be maintained in a permanent store. FIG. 10 shows a number of different exemplary database entries at 1000 that form a portion of such a database. The database entries include a link field 1002 that holds the information describing the link. Here, such information comprises the link's URL. There are also one or more fields 1004 for maintaining information regarding how frequently a user accesses a particular link. In this example, four exemplary fields are provided—each corresponding to a one-week time period. The "1 Wk" field can hold a value associated with a user's access frequency during the preceding week; the "2 Wk" field can hold a value associated with a user's access frequency two weeks ago, and so on. Additionally, a "Date Added" field 1006 includes the date when the user added the link to their favorites list.

In this example, database entries are ranked according to how frequently a user has accessed them. More frequently accessed links are ranked higher than less frequently accessed links. One way of ranking links is to calculate a score for each link that counts the number of times a user has accessed a link, weighting the more recent accesses heavier than the less recent accesses. Each score is then ordered in terms of highest to lowest to provide a ranked list of popular favorites with more popular links appearing toward the top of the list and less popular links appearing toward the bottom of the list or not appear on the list at all. Individual links can now be identified based upon how popular they are as measured by the user's access frequency. Next, the most recently added entries are ascertained in accordance with definable parameters. For example, a search query might specify that entries added within the last two weeks are to be identified. This provides a list of most recently added favorites. This list, and the links from the list of popular favorites are then combined to provide a collection of favorites that includes not only the most popular links (as determined by the user's access frequency), but the most recently added links as well. The latter portion of the list ensures that links that are of current interest to the user populate the "Top Favorites" list.

FIG. 11 is a flow diagram that describes steps in a method in accordance with this embodiment. This method can be implemented in any suitable hardware, software, firmware, or combination thereof. In the present example, the method is implemented in software. Step 1100 maintains a database containing information describing various user favorites. This information can include links to the favorites (such as URLs and the like), as well as information that describes the user's access frequency and when the favorite was added by the user to their favorites list. Exemplary database entries are shown in FIG. 10. Step 1102 runs a first database query that identifies and ranks the most frequently accessed user favorites. Step 1104 runs a second database query that identifies the most recently added favorites. Step 1106 then calculates a union of the first and second queries to provide a user's "Top Favorites" list.

Suggested Favorites

In another embodiment, a "Suggested Favorites" algorithm enables a user to see links that are associated with items that have been visited most often by the user as well as items that have visited most recently by the user. This algorithm is similar to the "Top Favorites" algorithm, except that instead of running a database query that identifies the most frequently and recently visited favorites (step 1104), a database query is run that identifies the most recently browsed items. Thus, this algorithm recognizes that items of particular interest to a user can include not only those items that a user adds to a manual list and visits frequently, but also items that they most recently visited or visit often and do not add to this list. To determine which items have been most recently visited, any suitable metric can be used, e.g. visited within the past 2 or 3 days.

In an exemplary implementation, a "Date Last Accessed" field 1008 (FIG. 10) can be included in the database 1000. Entries in this field include the dates when a user last accessed a particular item.

FIG. 12 is a flow diagram that describes steps in a method in accordance with this described embodiment. This method can be implemented in any suitable hardware, software, firmware, or combination thereof. In the present example, the method is implemented in software. Step 1200 maintains a database containing information describing various visited pages. This information can include links to the pages (such as URLs and the like), as well as information that describes the user's access frequency and when the page was last accessed by the user. Exemplary database entries are shown in FIG. 10. Step 1202 runs a first database query that identifies and ranks the most frequently accessed user pages. Step 1204 runs a second database query that identifies the most recently accessed pages. Step 1206 then calculates a union of the first and second queries to provide a user's "Suggested Favorites" list.

Recent Items List

In one embodiment, a "Recent Items List" is provided for a user. This embodiment is particularly useful in the context of the single window application program that provides multiple different functionalities. Recall that each of the different functionalities can have different associated content types, e.g. email messages, calendaring items, contacts, web pages, etc. The "Recent Items List" tracks, in memory, information pertaining to one or more of the last document of a particular content type that the user visited. Advantageously, the application program can store a link to the most recently browsed document of every content type that the application supports. For example, if an application contains email, calendaring, browsing, and contact functionalities, the "Recent Items List" can contain links to each of the most recently accessed documents of the particular content types. This can be extended to include more items in each list or other kinds of extended content: as new functionalities are added to the application, the list could expand to include those types as well. In addition, this algorithm can be extendible to incorporate newly created document types. For example, if a user adds an extension that provides a new document type, this algorithm can ensure that documents of the newly-created document type are included in the "Recent Items List."

Consider, for example, FIG. 13 which shows an exemplary "Recent Items List" 1300 that can be maintained in memory. In this example, the list contains five entries, one for each content type that is supported by the application. Each of the entries is a link that is associated with the most recently viewed document of a particular content type. For example, content type 1 might be a link to the last email message that was read, content type 2 might be a link to the last calendaring item that was browsed, content type 3 might be a link to the last web page that was browsed, etc.

One particularly useful implementation of the "Recent Items List" occurs in connection with the "back" navigation button drop down menu. Specifically, the navigation bar 408 (see FIGS. 5 and 6) includes a "back" navigation button in the form of a leftward-facing arrow. This navigation button includes a drop down menu that can be accessed by clicking on user-engagable indicia 411 located adjacent the button. The drop down menu might list the last three or four items that were most recently encountered by the user. Links to these items are managed in the navigation stack mentioned above. There may be times, however, when a user wishes to access a document on which they previously worked which is not listed in the back drop down menu. For example, consider the following: Assume that a user is browsing through various functionalities and visits an email message from a friend. The email message includes a link that the user follows to a web page. Assume further that the web page includes a 12-page article that the user clicks through. If a user wishes to return to their friend's email message, then they can click the "back" navigation button 12 times to navigate back through the 12 pages to get to the email message. Alternately, the user can click the "back" drop down menu to see the last three or four items that they browsed. Accordingly, the user would have to click this drop down menu multiple times.

In the described embodiment, the "back" drop down menu supports a "Recent Items List" which contains links to the most recently browsed items of the different content types if they do not appear in the back drop down menu. In the document-centric example above, the "Recent Items List" would contain links to the last mail message, last calendar item, last contact, and last document that the user visited, if those items do not appear in the back drop down menu.

Figure 14:
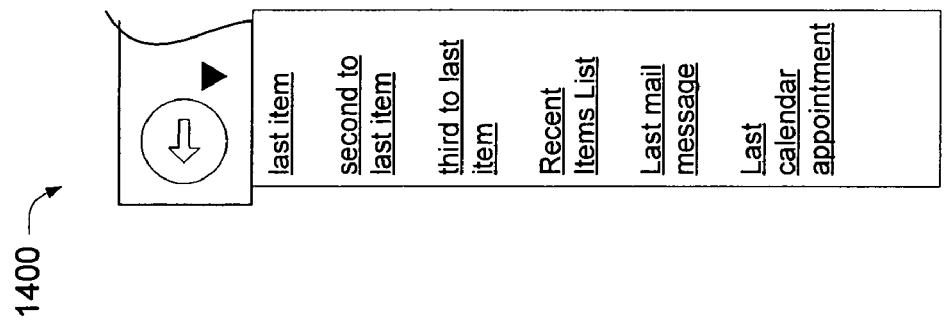
FIG. 14 is a diagram that illustrates an exemplary implementation of the "Recent Items List."

FIG. 14 shows an exemplary "back" drop down list 1400 that contains links to three most recently accessed items, as well as a "Recent Items List" that can be clicked on by a user. In the above example where the user has browsed a 12-page document, they would not see a link to their friend's email message in the navigation stack when they pulled down the drop down menu. They would, however, see a link to the email message in the "Recent Items List" because their friend's email message was the last email message type that was browsed or viewed by the user.

Conclusion

The methods and systems described above provide users with a much more user-centric computing experience that is tailored to particular users. The methods and systems provide this user-centric experience while conveniently enabling user participation without requiring the user to change their computing context. Multiple different functionalities can be provided that enable a user to accomplish multiple different tasks. Hence, while a user accomplishes a task associated with one functionality, they can view quick links associated with other functionalities without having to change their present computing context.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
   means for displaying, in a navigable window of a display area of a user interface, a first contextual display associated with a first context that can enable a user to accomplish one or more tasks, said displaying being accomplished using a single application program that is configured to provide multiple different contexts; and
   means for, without changing the first context and using the single application program, presenting quick links to one or more contexts that are different from the user's current context and that are provided by the single application program, each context being associated with a functionality that can enable the user to accomplish various tasks that are different from the one or more tasks that the user can accomplish using the first contextual display, the quick links being selectable to navigate the navigable window to a context associated with a selectable quick link, wherein said displaying is accomplished by the single application program using a navigable window comprising a single window, the application program being configured to navigate the single window between different contexts responsive to the user selecting a quick link;
   means for displaying user-engagable indicia, each of which being associated with one or more quick links, said indicia being configured for engagement by a user so that the user can view the associated one or more quick links.

2. The system of claim 1, wherein each functionality comprises a document-centric functionality.

3. The system of claim 1, wherein each of the functionalities is different.

4. The system of claim 1 further comprising means for automatically determining at least some of the quick links based, at least in part, on a user's behavior within the single application program.

5. The system of claim 1 further comprising means for automatically determining at least some of the quick links based, at least in part, on a user's history within the single application program.

6. The system of claim 1, wherein the single application program is configured with navigation instrumentalities that enable a user to navigate back and forth between the multiple different contexts.

7. The system of claim 6, wherein the single application program is configured with a navigation model to manage navigation activities of the user, the navigation model comprising a navigation stack.

8. The system of claim 1 further comprising:
   means for presenting the user with a choice of multiple different algorithms, each algorithm being configured to provide a different collection of quick links; and
   said means for presenting of the quick links presenting said quick links responsive to a user selecting one of the multiple different algorithms.

9. The system of claim 8, wherein one of the multiple different algorithms comprises an algorithm that presents quick links on a favorites list based on items visited most often by a user in combination with items that have been recently added by a user to a favorites list.

10. The system of claim 9, wherein one of the multiple different algorithms comprises an algorithm that presents quick links based on items visited most often by a user in combination with items that have been recently visited by a user.

11. The system of claim 8, wherein one of the algorithms comprises an algorithm that presents multiple quick links each of which representing a different document type that was the last item of a particular document type that was visited by a user.

12. The system of claim 8, wherein some of the algorithms are employable across multiple different content types.

13. A system comprising:
   one or more processors;
   one or more computer-readable media having computer-readable instructions thereon which, when executed by said one or more processors, cause said one or more processors to:
   provide multiple different functionalities within the confines of a single application program, the multiple different functionalities being associated with individual different document-centric tasks that can be accomplished by a user, individual document-centric tasks being associated with different document types and different contexts;
   define a single navigable window associated with a first context within which the different functionalities can be presented to a user so that they can accomplish a task associated with a particular functionality, the single navigable window being configured to navigate back and forth between the different functionalities;
   define individual user-engagable indicia and associate those indicia with one or more of the multiple different functionalities, each indicia being engagable by a user to display quick links that are associated with a functionality, individual quick links being associated with a document that can enable a user to accomplish a task each in a context separate from each other; and
   display one or more of the quick links associated with one functionality and context while a user is engaged in a task associated with another of the functionalities and contexts without requiring the user to change the functionality or context within which they are working.

14. The system of claim 13, wherein the instructions cause the computer to display a selection of multiple different algorithms from which a user can choose and which affect the quick links that are displayed.

15. The system of claim 14, wherein one of the multiple different algorithms comprises an algorithm that presents quick links on a favorites list based on items visited most often by a user in combination with items that have been recently added by a user to a favorites list.

16. The system of claim 14, wherein one of the multiple different algorithms comprises an algorithm that presents quick links based on items visited most often by a user in combination with items that have been recently visited by a user.

17. The system of claim 14, wherein one of the algorithms comprises an algorithm that presents multiple quick links each of which representing a different document type that was the last item of a particular document type that was visited by a user.

18. The system of claim 17, wherein said algorithm that presents multiple quick links is extendable to include newly created document types.

19. A system comprising:
   means for receiving information that pertains to multiple different user contexts within an application program;

means for presenting a display comprising a navigable window to a user, the display pertaining to a first user context within the application program, the first user context permitting the user to accomplish tasks pertaining to a first content type; and means for, without changing the first context and using the single application program, displaying multiple quick links that are associated with multiple contexts that are different from the first user context, the displayed quick links being associated with said information and being associated with a different content type, the quick links being selectable to navigate the navigable window to the different contexts, wherein each context is associated with a functionality that enables a user to accomplish various tasks that are different from the one or more tasks that the user can accomplish using the first contextual display;

means for displaying user-engagable indicia, each of which being associated with one or more quick links, said indicia being configured for engagement by a user so that the user can view the associated one or more quick links.

20. The system of claim 19, wherein the multiple different user contexts are each associated with a different content type.

* * * * *